(12) United States Patent
Itami

(10) Patent No.: US 7,177,968 B1
(45) Date of Patent: Feb. 13, 2007

(54) DATA TRANSMISSION SYSTEM

(75) Inventor: Shinji Itami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/980,098

(22) PCT Filed: May 26, 2000

(86) PCT No.: PCT/JP00/03405

§ 371 (c)(1),
(2), (4) Date: Mar. 15, 2002

(87) PCT Pub. No.: WO00/73915

PCT Pub. Date: Dec. 7, 2000

(30) Foreign Application Priority Data

May 31, 1999 (JP) .................................. 11/151019

(51) Int. Cl.
*G06F 13/14* (2006.01)
*G06F 12/00* (2006.01)

(52) U.S. Cl. ...................... 710/305; 710/106; 711/167; 711/219; 375/220

(58) Field of Classification Search ................ 710/107, 710/22, 35, 305, 105; 714/750; 711/219, 711/104, 167; 386/114; 327/166; 713/375; 375/371
See application file for complete search history.

(56) References Cited

U.S. PATENT DOCUMENTS

| | | | | |
|---|---|---|---|---|
| 4,254,499 A | * | 3/1981 | Yoshikane | 714/750 |
| 4,588,905 A | * | 5/1986 | Kojima | 327/166 |
| 4,757,392 A | * | 7/1988 | Awamoto et al. | 386/114 |
| 5,402,453 A | * | 3/1995 | Vavreck et al. | 375/371 |
| 5,758,188 A | * | 5/1998 | Appelbaum et al. | 710/35 |
| 5,918,072 A | * | 6/1999 | Bhattacharya | 710/35 |
| 6,021,478 A | * | 2/2000 | Kerstein et al. | 711/167 |
| 6,033,441 A | * | 3/2000 | Herbert | 713/375 |
| 6,175,883 B1 | * | 1/2001 | Kvamme et al. | 710/22 |
| 6,212,615 B1 | * | 4/2001 | Takahashi | 711/219 |
| 6,336,159 B1 | * | 1/2002 | MacWilliams et al. | 710/105 |
| 6,341,326 B1 | * | 1/2002 | Zhao et al. | 711/104 |
| 6,397,312 B1 | * | 5/2002 | Nakano et al. | 711/167 |
| 6,463,494 B1 | * | 10/2002 | Morriss et al. | 710/305 |
| 6,480,946 B1 | * | 11/2002 | Tomishima et al. | 711/167 |
| 6,581,124 B1 | * | 6/2003 | Anand | 710/305 |

FOREIGN PATENT DOCUMENTS

JP        1-173149        7/1989

OTHER PUBLICATIONS

Patent Abstracts of Japan 01-173149, Jul. 7, 1989.

\* cited by examiner

*Primary Examiner*—Christopher E. Lee
(74) *Attorney, Agent, or Firm*—Sughrue Mion, PLLC

(57) ABSTRACT

In a data transmission system for carrying out data transmission/reception between a primary board and secondary boards by using a data transmission path, which employs a same signal line as an address bus and a data bus mutually, there are provided steps of informing a start address required for data access when the data access is executed from the primary board to the secondary boards, and generating an address used in the data access in the secondary boards based on the start address and a predetermined trigger signal.

11 Claims, 19 Drawing Sheets

DATA TRANSMISSION SYSTEM

TECHNICAL FIELD

The present invention relates to data transmission between a primary board and secondary boards, that is capable of executing the data transmission safely against various disturbances such as skew, reflection, etc. between control signals in the data transmission, which act as causes of the malfunction when the continuous data transmission is carried out, via fewer signal lines.

BACKGROUND ART

A configuration of the data transmission in the prior art will be explained hereunder.

FIG. 16 is a system configurative view showing a system configuration in connection with the data transmission.

In FIG. 16, 100 is a primary board on the data transmission transmitter side, 200 is a secondary board on the data transmission receiver side, and 300 is a data transmission bus for connecting the primary board 100 and the secondary board 200.

In this case, a plurality of secondary board A 200a, secondary board B 200b, . . . , secondary board N 200n as the secondary board 200 are connected to the primary board 100 via the data transmission bus 300.

FIG. 17 is a view showing an internal configuration of the secondary board in the prior art. In FIG. 17, 201 is a trigger signal (TRG) showing write timing/read timing of the data transmission bus 300, 202 is FRAME showing that the data transmission bus 300 is in transfer, 203 is WRL showing that the data transmission bus 300 is in the writing operation, 204 is RDL showing that the data transmission bus 300 is the reading operation, 205 is a signal A1:0 showing lower two bits of the data transmission bus 300, 206 is a multiplex bus A15:2/D15:0 contained in the data transmission bus 300, for sharing address signals and data signals in a time sharing system to show addresses 15 to 2 and data 15 to 0, 207 is a separator for separating the multiplex bus into an address bus and a data bus, 208 is a memory for storing contents of the data transmission, 209 is an address bus MA15:0 for connecting the separator and the memory, 210 is a data bus MD15:0 for connecting the separator and the memory, 211 is a memory writing signal MWRL for connecting the separator and the memory, and 212 is a memory read signal MRDL for connecting the separator and the memory.

FIG. 18 is a flowchart showing an internal process in the separator 207.

In step S201, in order to detect whether or not the data transmission about own board is present, the separator 207 stands by until FRAME 202=L and A15:0=own address are satisfied.

If the present conditions are satisfied in step S201, either WRL=L or RDL=L is detected in step S202 in order to decide whether or not the data transmission is to read or write.

Here, in the case of RDL=L, the process goes to step S203 to show the read (reading process). In the case of WRL=L, the process goes to step S204 to show the write (writing process).

When the reading process (step S203) or the writing process (step S204) is completed, a transmission completing process is carried out and then a series of transmission processes are ended.

-Reading Process-

Next, the reading process (step S203) will be explained with FIG. 19, FIG. 20, and FIG. 21 hereunder.

FIG. 19 is a timing chart showing time-series operations of respective signals in the reading process.

FIG. 20 is a flowchart showing a series of flows in the reading process of the primary board in the prior art.

FIG. 21 is a flowchart showing a series of flows in the reading process of the separator portion of the secondary board in the prior art.

In step S211, at a leading edge of TRG 201 in a T41 period, the primary board assigns FRAME 202 indicating that the data transmission is being carried out to L, assigns RDL indicating the reading transmission to L, assigns lower two bits of the transmission start address to a signal A1:0 (205), and assigns the upper address to the multiplex bus A15:2/D15:0 (206).

In contrast, the secondary board detects the transmission start of own address based on the process in step S201 at the leading edge of TRG 201 in the T41 period.

The primary board executes step S212 in a T42 period and also stops the output to switch the output direction of the multiplex bus A15:2/D15:0 (206), and then switches the transmission direction of the multiplex bus A15:2/D15:0 (206) from the output to the input in step S213.

The present period is used as a transmission direction switching period of the multiplex bus A15:2/D15:0 (206).

The secondary board interprets the transmission direction switching period of the multiplex bus A15:2/D15:0 (206) based on step S231 at a trailing edge of the TRG 201 in the T42 period, and switches the multiplex bus A15:2/D15:0 (206) from the input direction to the output direction and switches the cycle from the address cycle to the data reading cycle.

The secondary board executes step S232 at a leading edge of TRG 201 in a T43 period to check that the transmission is being executed, then executes step S233 to output the address which is constructed by synthesizing the address A15:2/D15:0 (206) assigned from the primary board in the T42 period and A1:0 (205) to MA15:0 (209), and then controls MRDL 212 based on step S234 to execute the memory read.

Then, the data 1 is output to AD15:2/D15:0 based on step S235.

The primary board executes step S214 at a trailing edge of TRG 201 in a T43 period to read the data 1.

Then, the primary board executes step S215 at a leading edge of TRG 201 in a T44 period to switch A1:0 (205), and outputs the next address to the lower address A1:0 (205).

As for the data 2 to 4, operations of the primary board are similar to step S214 and step S215, and operations of the secondary board can be implemented by repeating a series of processes in steps S232 to S235.

The primary board executes step S220 at a trailing edge of TRG 201 in a T46 period to read the data 4, and then outputs FRAME 202=H in step S221 to indicate the end of the data transmission.

The secondary board detects the end of the transmission based on step S232 to end the reading process.

-Writing Process-

Next, the writing process (step S204) will be explained with FIG. 22, FIG. 23, and FIG. 24 hereunder.

FIG. 22 is a timing chart showing time-series operations of respective signals in the writing process.

FIG. 23 is a flowchart showing a series of flows in the writing process of the primary board.

FIG. 24 is a flowchart showing a series of flows in the writing process in the separator portion of the secondary board.

In step S241, at a leading edge of TRG 201 in a T51 period, the primary board assigns FRAME 202 indicating that the transmission is being carried out to L, assigns WRL indicating the writing transmission to L, assigns lower two bits of the transmission start address to an A1:0 (205), and assigns the upper address to the A15:2/D15:0 (206).

Meanwhile, the secondary board detects the transmission start of own address based on the process in step S201 at a trailing edge of TRG 201 in the T51 period.

The primary board executes step S242 in a T52 period to output the write data 1 to A15:2/D15:0 (206).

In contrast, the secondary board executes step S261 at a trailing edge of TRG 201 in the T52 period to check that the transmission is being executed, and goes to step S262. In step S262, the address (A15:0) that is constructed by synthesizing A15:2/D15:0 (206) and A1:0 (205) is output to MA15:0 (209).

Then, the data on the AD15:2/D15:0 is input in step S263, and MWRL 211 is controlled in step S264 to execute the memory write.

The primary board executes step S243 at a leading edge of TRG 201 in a T53 period to switch A1:0 (205), and outputs the next address to the lower address A1:0 (205).

As for the data 2 to 4, operations of the primary board are similar to step S242 and step S243, and operations of the secondary board can be implemented by repeating a series of processes in steps S261 to S264.

The primary board executes step S251 at a leading edge of TRG 201 in a T56 period, and then outputs FRAME 202=H in step S221 to indicate the end of the data transmission.

The secondary board detects the end of the transmission based on step S261 to end the writing process.

In the above data transmission in the prior art, the number of the data in the continuous transmission is decided by the number of lower address signal lines, and also the lower address signal lines must be added in order to accomplish a great deal of continuous transmission, so that the number of signal lines is increased. Therefore, there is the problem that a cost and packaged parts have a tendency to increase.

DISCLOSURE OF THE INVENTION

The present invention has been made to overcome such problems and it is an object of the present invention is to provide a stable, huge and continuous data transmission via fewer signal lines.

In order to achieve this object, according to an aspect, there is provided a data transmission system for carrying out data transmission/reception between a primary board and secondary boards by using a data transmission path, which employs a same signal line as an address bus and a data bus mutually, comprising the steps of informing a start address required for data access when the data access is executed from the primary board to the secondary boards, and generating an address used in the data access in the secondary boards based on the start address and a predetermined trigger signal.

In particular, a cycle signal indicating switching of data is used in combination with the trigger signal.

Also, when the address is generated based on the trigger signal, the address is generated sequentially by incrementing the start address in response to a timing of the trigger signal.

Also, there is provided a data transmission system for carrying out data transmission/reception between a primary board and secondary boards by using a data transmission path, which employs a same signal line as an address bus and a data bus mutually, comprising the steps of informing a memory start address of the secondary boards required for data access when the data access is executed from the primary board to the secondary boards, judging in the secondary boards whether or not the memory start address is directed to own station, and then executing the data transmission via the data transmission path by accessing a memory in own station based on the memory start address when the memory start address is directed to own station, and generating an address, to which the data transmission is subsequently executed, in the secondary boards by incrementing the memory start address after the data transmission based on the memory start address is ended, and then executing the data transmission via the data transmission path by accessing the memory of own station based on the generated address.

Also, there is provided a data transmission system for carrying out data read between a primary board and secondary boards by using a data transmission path, which employs a same signal line as an address bus and a data bus mutually, comprising the steps of informing a trigger signal indicating a timing of data access and a start address required for data read via the data transmission path, switching the data transmission path to which the start address is informed as a data bus, accessing a memory based on the start address and sending out a read result onto the data transmission path, and incrementing the start address at a timing of the trigger signal, and then sending out a read result onto the data transmission path by accessing the memory based on the incremented address.

Also, there is provided a data transmission system for carrying out data write between a primary board and secondary boards by using a data transmission path, which employs a same signal line as an address bus and a data bus mutually, comprising the steps of informing a trigger signal indicating a timing of data access and a start address required for data write via the data transmission path, switching the data transmission path to which the start address is informed as a data bus, and then sending out a predetermined data to be written to a memory, accessing the memory based on the start address, and then writing the predetermined data into the memory, and incrementing the start address at a timing of the trigger signal, and then writing sequentially the predetermined data, that are sent out via the data transmission path, into the memory by accessing the memory based on the incremented address.

BEST MODES FOR CARRYING OUT THE INVENTION

Next, embodiments of the present invention will be explained hereinafter.

Embodiment 1

First, a configuration of the embodiment 1 will be explained hereunder.

Figure 1:
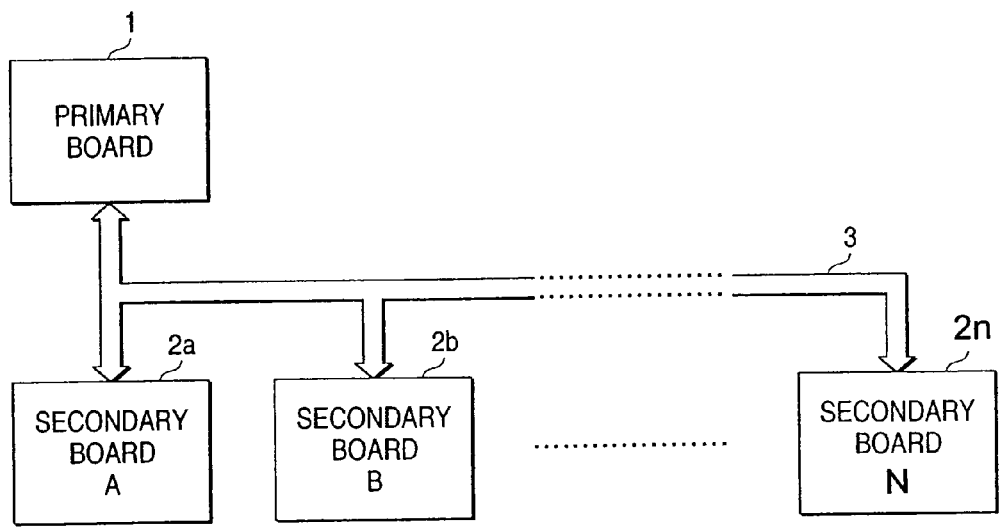
FIG. 1 is a system configurative view showing a system configuration in connection with the data transmission in an embodiment 1.

FIG. 1 is a system configurative view showing a system configuration in connection with the data transmission.

In FIG. 1, 1 is a primary board on the data transmission transmitter side, 2 is a secondary board on the data transmission receiver side, and 3 is a data transmission bus for connecting the primary board 1 and the secondary board 2.

In this case, a plurality of secondary board A 2a, secondary board B 2b, . . . , secondary board N 2n are connected as the secondary board 2 to the primary board 1 via the data transmission bus 3.

Figure 2:
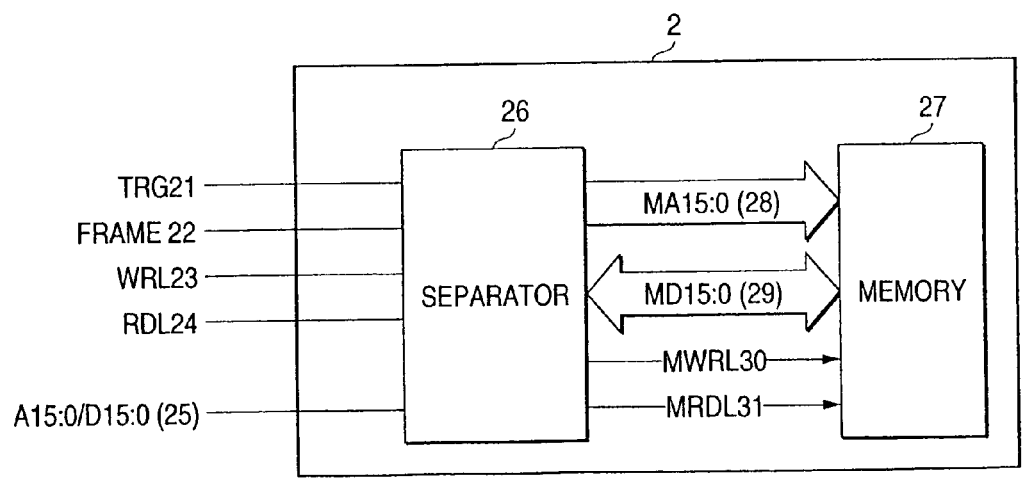
FIG. 2 is a view showing an internal configuration of a secondary board.

FIG. 2 is a view showing an internal configuration of the secondary board in the present embodiment.

In FIG. 2, 21 is TRG showing write timing/read timing of the data transmission bus 3, and is generated in response to the leading edge of am internal clock (CLK) 20 in the primary board 1.

Also, 22 is FRAME showing that the transmission is being carried out over the data transmission bus 3, 23 is WRL showing the data transmission bus 3 is in the writing operation, and 24 is RDL showing the data transmission bus 3 is in the reading operation. In this case, FRAME 22, WRL 23, RDL 24 are also generated in response to the leading edge of am internal clock (CLK) 20 in the primary board 1.

Also, 25 is a multiplex bus A15:0/D15:0 that shares the address signal and the data signal in a time sharing system, 26 is a separator embodying the present embodiment 1 and generates signals showing respective statuses of address, idle (transmission direction switching, etc.), data transmission/reception in synchronism with TRG 21 so as to switch the signals.

Also, 27 is a memory. For example, memory spaces are decided uniquely such that the secondary board A is "000 to 1FFF", the secondary board B is "200 to 3FFF", and others.

Also, 28 is an address bus MA15:0 for connecting the separator 26 and the memory 27, 29 is a data bus MD15:0 for connecting the separator 26 and the memory 27, 30 is a memory write signal MWRL for connecting the separator 26 and the memory 27, and 31 is a memory read signal MWDL for connecting the separator 26 and the memory 27.

In order to detect whether or not the data transmission about own board is present, the separator 26 stands by until FRAME 22=L and A15:0=own address are satisfied. When the present conditions are satisfied, the separator 26 detects any one of WRL=L (writing) and RDL=L (reading) in order to decide that the data transmission is the reading or the writing.

The reading process is carried out at the time of RDL=L, and the writing process is carried out at the time of WRL=L.

Then, after the reading process or the writing process is completed, the transmission ending process is executed to end a series of transmission processes.

-Reading Process-

Next, the reading process will be explained with FIG. 3, FIG. 4, and FIG. 5 hereunder.

Figure 3:
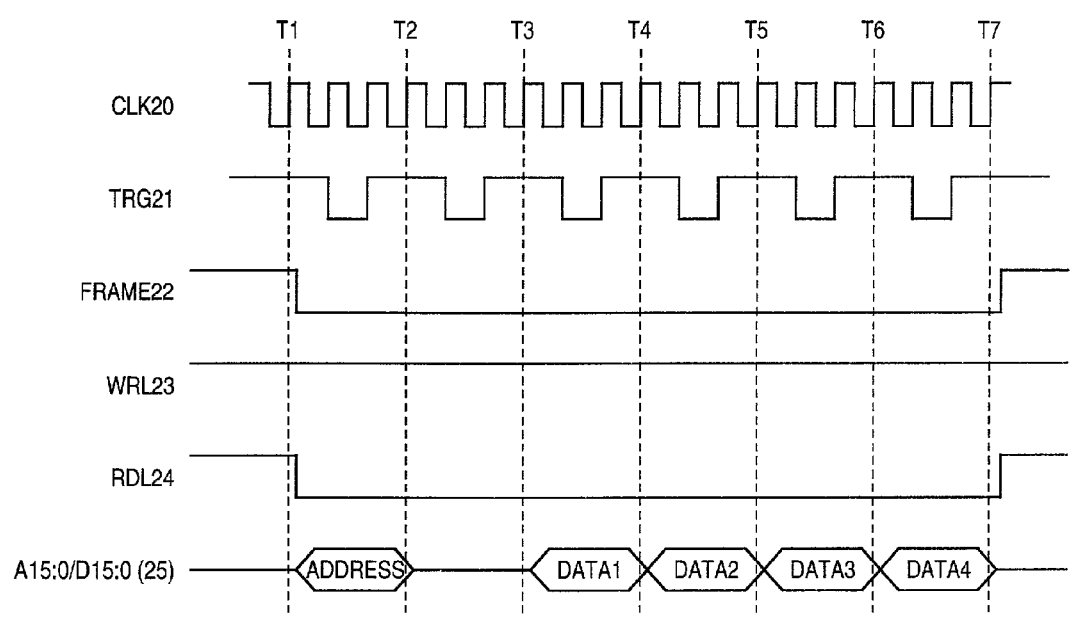
FIG. 3 is a timing chart showing time-series operations of respective signals in a reading process.

FIG. 3 is a timing chart showing time-series operations of respective signals in the reading process in the present embodiment.

Figure 4:
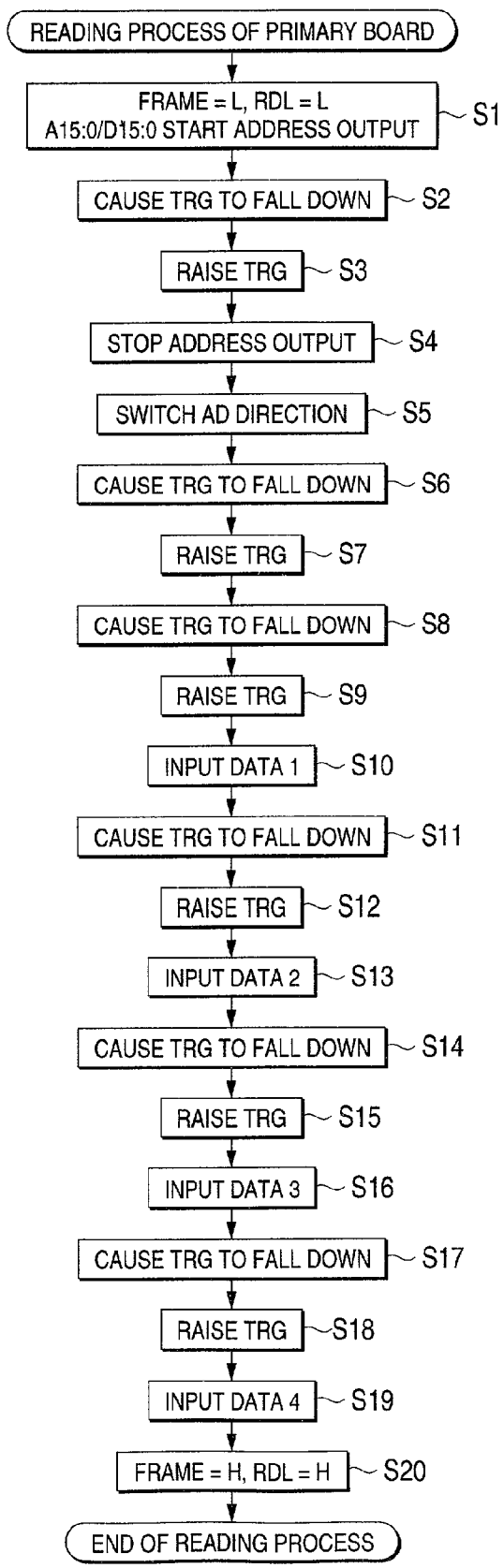
FIG. 4 is a flowchart showing a series of flows in the reading process of a primary board.

FIG. 4 is a flowchart showing flows in the reading process of the primary board in the present embodiment.

Figure 5:
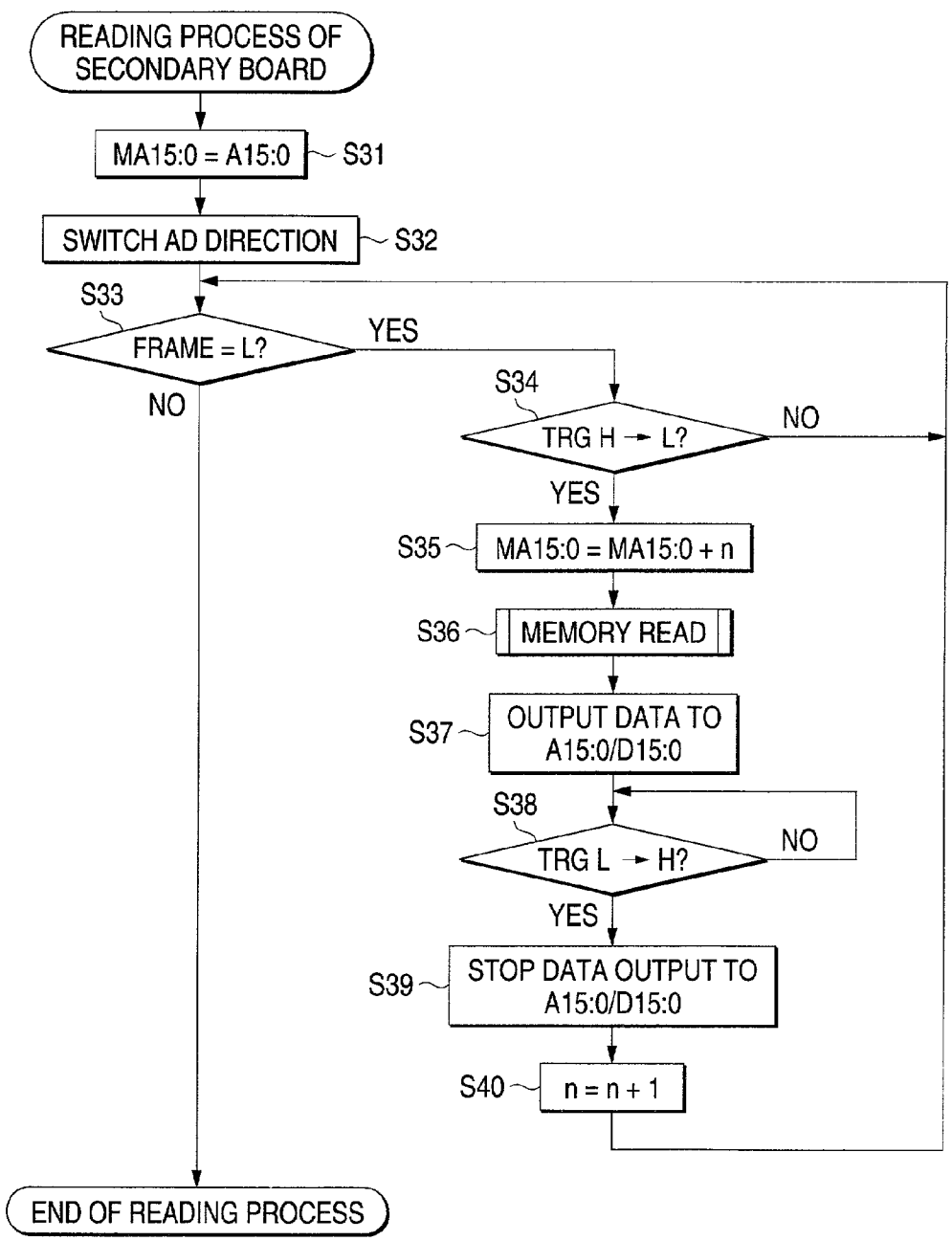
FIG. 5 is a flowchart showing flows in the reading process of the secondary board.

FIG. 5 is a flowchart showing a series of flows in the reading process of the secondary board in the present embodiment.

<T1 Period>

In the T1 period, in step S1, when the reading process is required, the primary board assigns the FRAME 22 indicating the transmission is being carried out to L, assigns the RDL 24 indicating the reading transmission to L, and assigns the transmission start address to the multiplex bus A15:0/D15:0 (25), in response to the rise of the CLK 20.

Then, in step S2, the primary board that outputs respective signals as above causes the TRG 21 to fall down.

Meanwhile, in the T1 period, in step S31, when the secondary board detects the reading process about own station based on the satisfaction of A15:0=own address, such secondary board transfers and holds the contents of the multiplex bus A15:0/D15:0 (25), to which the transmission start address is assigned, to MA15:0 at the point of time of the trailing edge of the TRG 21 to define the address of the memory 27.

Then, in step S3, the primary board causes the TRG 21 to rise in response to the leading edge of the CLK 20.

<T2 Period>

In the T2 period, in step S4, the primary board stops the address output in response to the leading edge of the CLK 20 to switch the output direction. Then, the primary board switches the transmission direction from the output to the input in step S5, and then causes the TRG 21 to fall down in step S6.

Then, in step S7, the primary board raises the TRG 21.

Meanwhile, in step S32, the secondary board interprets the transmission direction switching period of the multiplex bus A15:0/D15:0 (25) at the trailing edge of the TRG 21 and then switches the multiplex bus A15:0/D15:0 (25) from the input direction to the output direction by the separator 26 and also switches the cycle from the address cycle to the data reading cycle.

<T3 Period>

In the T3 period, in step S8, the primary board raises the TRG 21 in order to require the read data of the secondary board.

The secondary board executes step S33 to check that the transmission is being carried out, and then detects the trailing edge of the TRG 21 in step S34.

The secondary board that has detected the TRG 21 outputs the start address designated by the primary board to the memory 27 via the MA15:0 (28) in step S35, and then executes the memory read by operating the MRDL 31 in step S36.

Then, in step S37, the secondary board outputs the data 1 to the A15:0/D15:0 (25).

The primary board raises the TRG 21 in step S9 in order to inform the secondary board of the reading timing, and simultaneously executes step S10 to receive the data 1 from the A15:0/D15:0 (25) and execute the reading process.

The secondary board executes step S39 in response to the rise of the TRG 21 (step S38) to stop the output to the A15:0/D15:0 (25). Then, in step S40, the secondary board calculates an incremented value in order to prepare the formation of the next transmission address.

<T4 Period>

In the T4 period, the primary board executes step S11 to cause the TRG 21 to fall down.

The secondary board executes step S33 to check that the transmission is being carried out, and also detects the trailing edge of the TRG 21 in step S34.

The secondary board that has detected the TRG 21 outputs the addition result of the start address designated by the primary board and the incremented value prepared in step S40 (the address incremented in response to the trailing edge of the TRG 21) as the next transmission address to the memory 27 via the MA15:0 (28) in step S35, and then goes to step S36.

Here, the next transmission address obtained by incrementing the transmission start address is continuously generated such that the next transmission address is "001" if the transmission start address is "000" and the transmission address after next is "002" that is obtained by adding +2 to "000".

The secondary board executes the memory read in step S36, and then outputs the data 2 to the A15:0/D15:0 (25) in step S37.

The primary board raises the TRG 21 in step S12 and executes step S13 simultaneously to receive the data 2 from the A15:0/D15:0 (25) and execute the reading process.

The secondary board executes step S39 in response to the leading edge of the TRG 21 to stop the output to the A15:0/D15:0 (25), and then executes the preparation of the next transmission address in step S40.

<T5 Period>

In the T5 period, in order to require the data 3 of the secondary board, the primary board causes the TRG 21 to fall down in step S14.

The secondary board executes step S33 to check that the transmission is being carried out, and then detects the trailing edge of the TRG 21 in step S34.

The secondary board that has detected the TRG 21 outputs the addition result of the start address designated by the primary board and the incremented value prepared in step S40 to the memory as the next transmission address in step S35, then executes the memory read in step S36, and then outputs the data 3 to the A15:0/D15:0 (25) in step S37.

The primary board raises the TRG 21 in step S15, and simultaneously inputs the data 3 from the A15:0/D15:0 (25) to execute the reading process in step S16.

The secondary board executes step S39 in response to the leading edge of the TRG 21 to stop the output to the A15:0/D15:0 (25), and then executes the preparation of the next transmission address in step S40.

<T6 Period>

In the T6 period, in order to require the data 4 of the secondary board, the primary board causes the TRG 21 to fall down in step S17.

The secondary board executes step S33 to check that the transmission is being carried out, and detects the trailing edge of the TRG 21 in step S34.

The secondary board that has detected the TRG 21 outputs the addition result of the start address designated by the primary board and the incremented value prepared in step S40 to the memory as the next transmission address in step S35, and then goes to step S36. The secondary board executes the memory read in step S36, and outputs the data 4 to the A15:0/D15:0 (25) in step S37.

The primary board raises the TRG 21 in step S18, and executes step S19 at the same time to receive the data 4 from the A15:0/D15:0 (25) and execute the reading process.

The secondary board executes step S39 in response to the leading edge of the TRG 21 to stop the output to the A15:0/D15:0 (25), and executes the preparation of the next transmission address in step S40.

<T7 Period>

The primary board executes step S20 in order to indicate the end of transmission, and assigns the FRAME 22 and the RDL 24 to H.

The secondary board detects the FRAME 22=H in step S33, and completes the reading process.

-Writing Process-

Next, the writing process will be explained with FIG. 6, FIG. 7, and FIG. 8 hereunder.

Figure 6:
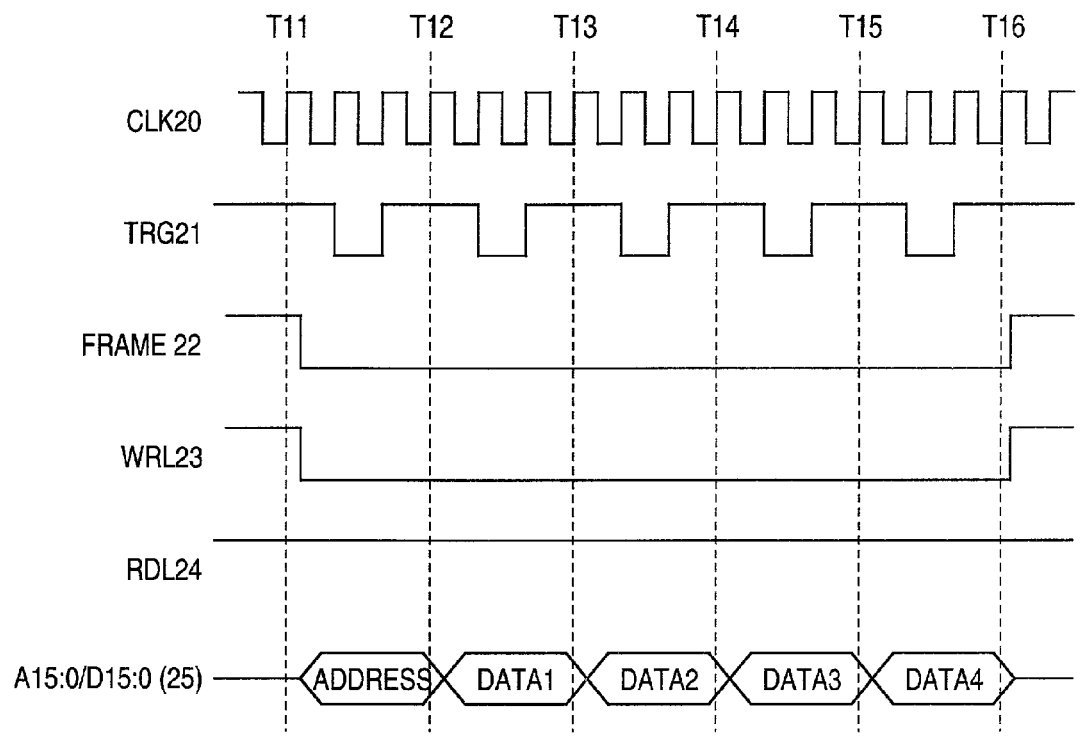
FIG. 6 is a timing chart showing time-series operations of respective signals in a writing process.

FIG. 6 is a timing chart showing time-series operations of respective signals in the writing process.

Figure 7:
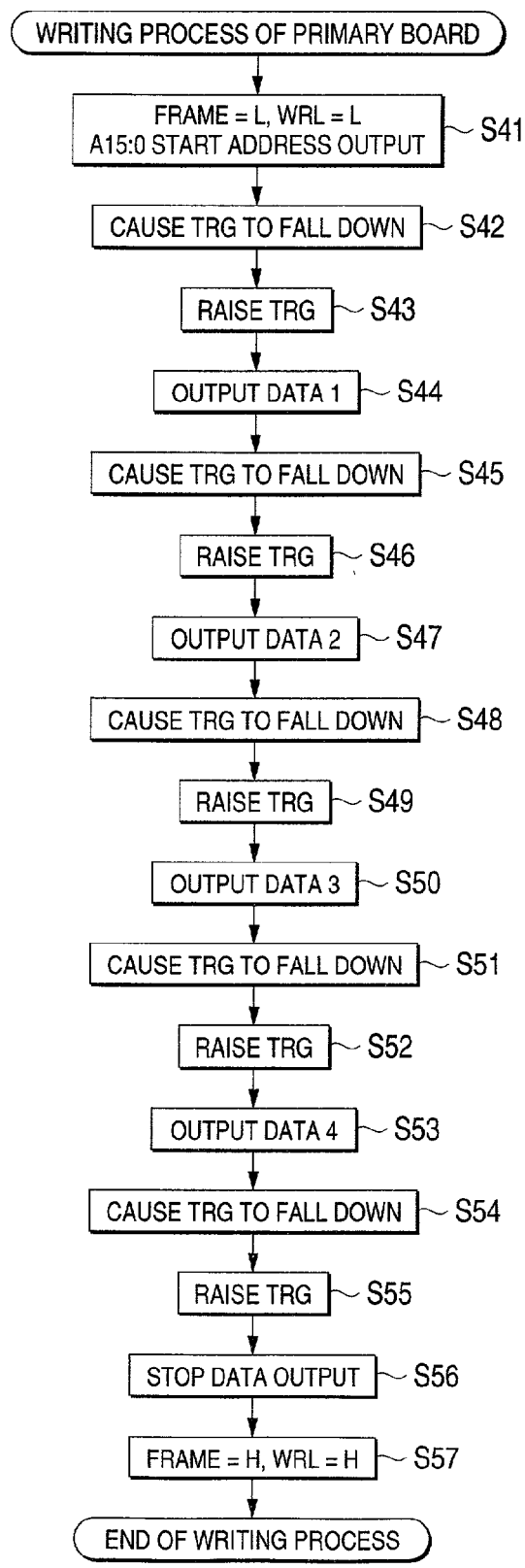
FIG. 7 is a flowchart showing flows in the writing process of the primary board.

FIG. 7 is a flowchart showing a series of flows in the writing process of the primary board.

Figure 8:
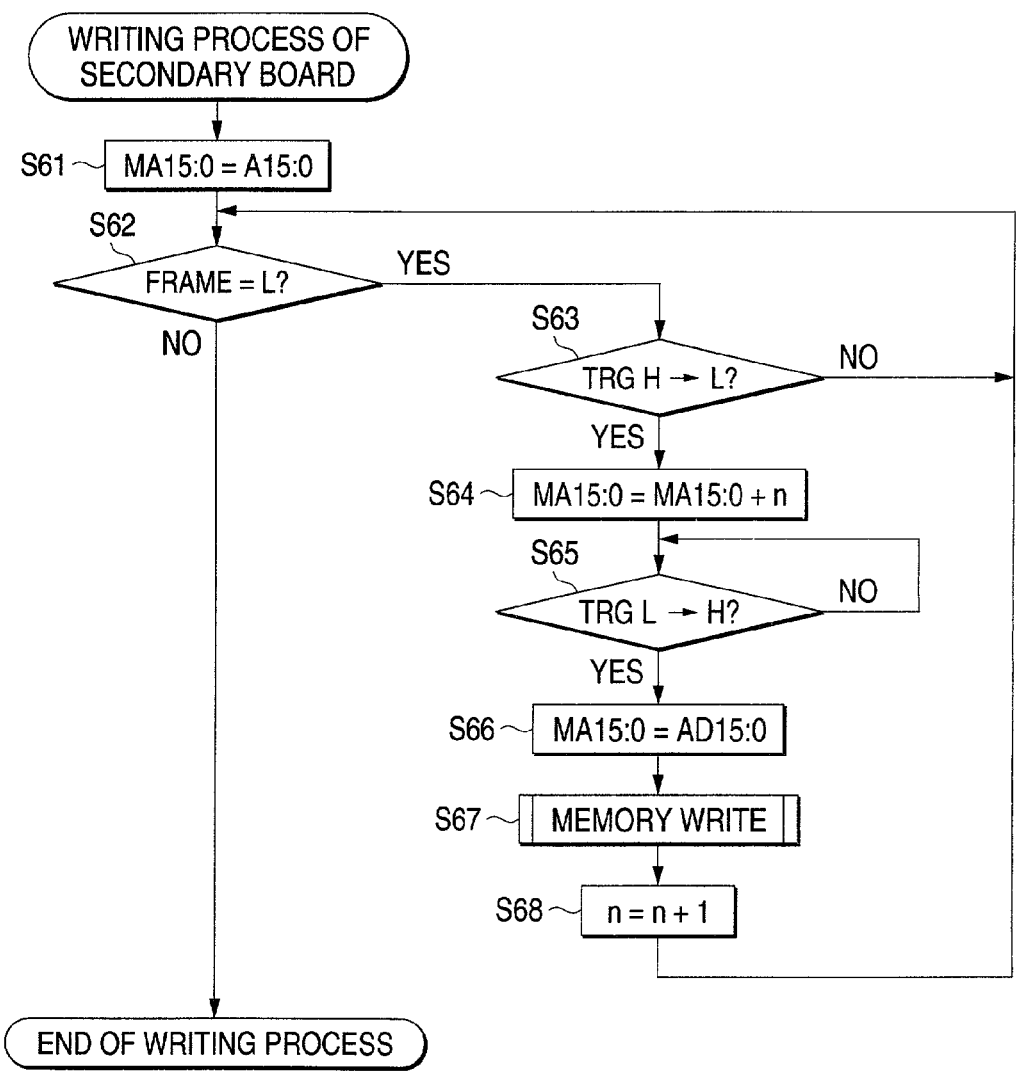
FIG. 8 is a flowchart showing flows in the writing process of the secondary board.

FIG. 8 is a flowchart showing a series of flows in the writing process of the secondary board.

<T11 Period>

In the T11 period, when the writing process is required, the primary board assigns the FRAME 22 indicating that the transmission is being carried out to L, assigns the WRL 23 indicating the writing transmission to L, and assigns the start address to the multiplex bus A15:0/D15:0 (25), in response to the leading edge of the CLK 20 in step S41.

Then, in step S42, the primary board that has outputted the above signals causes the TRG 21 to fall down.

In contrast, in the T11 period, when the secondary board detects the writing process to own station based on the satisfaction of A15:0=own address, such secondary board transfers and holds contents of the multiplex bus A15:0/D15:0 (25), to which the transmission start address is assigned, to MA15:0 at the trailing edge of the TRG 21 in step S61 and defines the address of the memory.

Then, the primary board raises the TRG 21 in step S43.

<T12 Period>

In the T12 period, the primary board executes step S44 to output the write data 1 to the multiplex bus A15:0/D15:0 (25).

Then, in order to inform the secondary board of the sending of the data, the primary board causes the TRG 21 to fall down in step S45.

At this point of time, the secondary board checks that the transmission is being carried out in step S62 and also detects that the TRG 21 has been caused to fall down in step S63.

Then, in step S64, the secondary board outputs the address requested by the primary board to the memory via the MA15:0 (28).

In order to inform the secondary board of the input of the data, the primary board raises the TRG 21 in step S46 and requests the secondary board to write the data 1.

The secondary board detects the leading edge of the TRG 21 in step S65, then executes step S66 to output the write data 1 to the MD15:0 (29) from the separator 26, and then executes the memory write in step S67.

Then, the secondary board calculates the incremented value in step S68 to prepare for the next address, and then returns to step S62.

<T13 Period>

In the T13 period, the primary board executes step S47 to output the write data 2 to the multiplex bus A15:0/D15:0 (25).

In order to inform the secondary board of the sending of the data, the primary board causes the TRG 21 to fall down in step S48.

At this point of time, the secondary board detects that the TRG 21 is raised in steps S62 and S63, then outputs the addition value of the transmission start address of the primary board and the incremented value prepared in step S68 (the address incremented in response to the trailing edge of the TRG 21) as the next transmission address to the memory via the MA15:0 (28), and then goes to step S65.

Here, the next transmission address obtained by incrementing the transmission start address is continuously generated such that the next transmission address is "001" if the transmission start address is "000" and the transmission address after next is "002" that is obtained by adding +2 to "000".

In order to inform the secondary board of the input of the data, the primary board raises the TRG 21 in step S49 and requests the secondary board to write the data 2.

The secondary board detects the leading edge of the TRG 21 in step S65, then executes step S66 to output the write data 2 to the MD15:0 (29), and then executes the memory write in step S67.

Then, the secondary board executes step S68 to prepare for the next address, and then returns to step S62.

<T14 Period>

In the T14 period, the primary board executes step S50 to output the write data 3 to the multiplex bus A15:0/D15:0 (25).

In order to inform the secondary board of the sending of the data, the primary board causes the TRG 21 to fall down in step S51.

At this point of time, the secondary board detects the rise of the TRG 21 in steps S62, S63, and then outputs the added value of the requested address by the primary board and the incremented value prepared in step S68 as the next transmission address to the memory via the MA15:0 (28) in step S64.

In order to inform the secondary board of the input of the data, the primary board raises the TRG 21 in step S52 and requests the secondary board to write the data 3.

The secondary board detects the rise of the TRG 21 in step S65, then executes step S66 to output the write data to the MD15:0 (29), and then executes the memory write in step S67.

Then, the secondary board executes step S68 to prepare for the next address, and then returns to step S62.

<T15 Period>

In the T15 period, the primary board executes step S53 to output the write data 4 to the multiplex bus A15:0/D15:0 (25).

In order to inform the secondary board of the sending of the data, the primary board causes the TRG 21 to fall down in step S54.

At this point of time, the secondary board detects the rise of the TRG 21 in steps S62, S63, and then outputs the added value of the request address by the primary board and the incremented valued prepared in step S68 as the next transmission address to the memory via the MA15:0 (28) in step S64.

In order to inform the secondary board of the input of the data, the primary board raises the TRG 21 in step S54 and requests the secondary board to write the data 4.

The secondary board detects the rise of the TRG 21 in step S65, then executes step S66 to output the write data 4 to the MD15:0 (29), and then executes the memory write in step S67.

Then, the secondary board executes step S68 to prepare for the next address, and then returns to step S62.

The primary board stops the data output in step S56 after it raises the TRG 21, and then changes the FRAME 22 and the WRL 23 to H in step S57, whereby the write transmission is ended.

The secondary board detects the completion of the write transmission in step S62, so that the writing process is completed.

In this embodiment 1, the MA15:0 (28) is generated by the separator 26 in the secondary board by using the trailing edge of the TRG 21.

For this reason, there is no necessity that the read/write address should be transmitted every process from the primary board via the bus. Thus, the advantages that the reduction of the lower addresses can be achieved and also a great deal of continuous data transmission can be accomplished via fewer signal lines.

In addition, the bus portions used to send out the address signal in the prior art can be reduced. Thus, the circuit packaging can be simplified and also the reduction in the fabrication cost and the reduction in size and weight of the bus board can be achieved.

In other words, according to the present embodiment, the stable transmission can be implemented while reducing the signal lines in the data transmission.

Also, phases of the TRG 21 and the address/data buses are managed in the present embodiment so as to have a predetermined margin in the switching of the data address respectively. Therefore, the missing of the data can be reduced.

Embodiment 2

A system configuration of the embodiment 2 is identical to the system configuration shown in FIG. 1.

Figure 9:
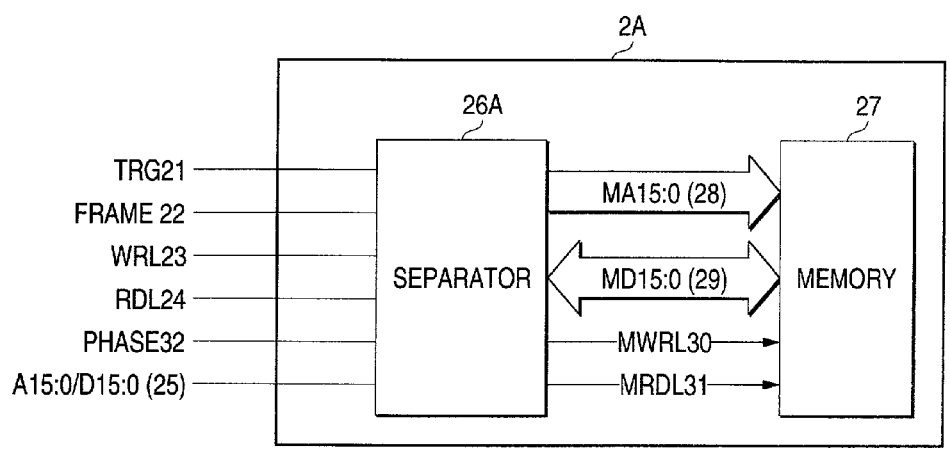
FIG. 9 is a view showing an internal configuration of a secondary board in an embodiment 2.

FIG. 9 is a view showing an internal configuration of the secondary board in the embodiment 2.

In FIG. 9, 21 is a trigger signal (TRG) showing the write timing/read timing of the data transmission bus 3, and is generated in such a state that the signal has phases such as the continuation of rising/falling/rising, in response to the leading edge of the internal clock 20 in the primary board.

Also, 22 is FRAME showing that the data transmission bus 3 is in the transmission, 23 is WRL showing that the data transmission bus 3 is in the writing operation, 24 is RDL showing that the data transmission bus 3 is in the reading operation, 25 is the multiplex bus A15:0/D15:0 that shares the data signal and the data signal in a time sharing system, and 26A is the separator that embodies the present embodiment 2 and generates signals showing respective statuses of the address, the idle (transmission direction switching, etc.), and the data transmission/reception in response to the TRG 21 and switches the signals.

Also, 27 is the memory for storing contents of the data transmission, 28 is the address bus MA15:0 for connecting the separator 26A and the memory 27, 29 is the data bus MD15:0 for connecting the separator 26A and the memory 27, 30 is the memory writing signal MWRL for connecting the separator 26A and the memory 27, 31 is the memory reading signal MRDL for connecting the separator 26A and the memory 27, and 32 is the PHASE signal serving as the cycle signal that counts three times the leading edge of the CLK 20 to toggle.

In order to detect whether or not the data transmission about own board is present, the separator 26A stands by until FRAME 22=L and A15:0=own address are satisfied. When the present conditions are satisfied, the separator 26A detects either WRL=L (writing) or RDL=L (reading) in order to decide that the data transmission is the reading or the writing.

The reading process is carried out at the time of RDL=L, and the writing process is carried out at the time of WRL=L.

Then, after the reading process or the writing process is completed, the transmission ending process is executed to end a series of transmission processes.

-Reading Process-

Next, the reading process will be explained with FIG. 10, FIG. 11, and FIG. 12 hereunder.

Figure 10:
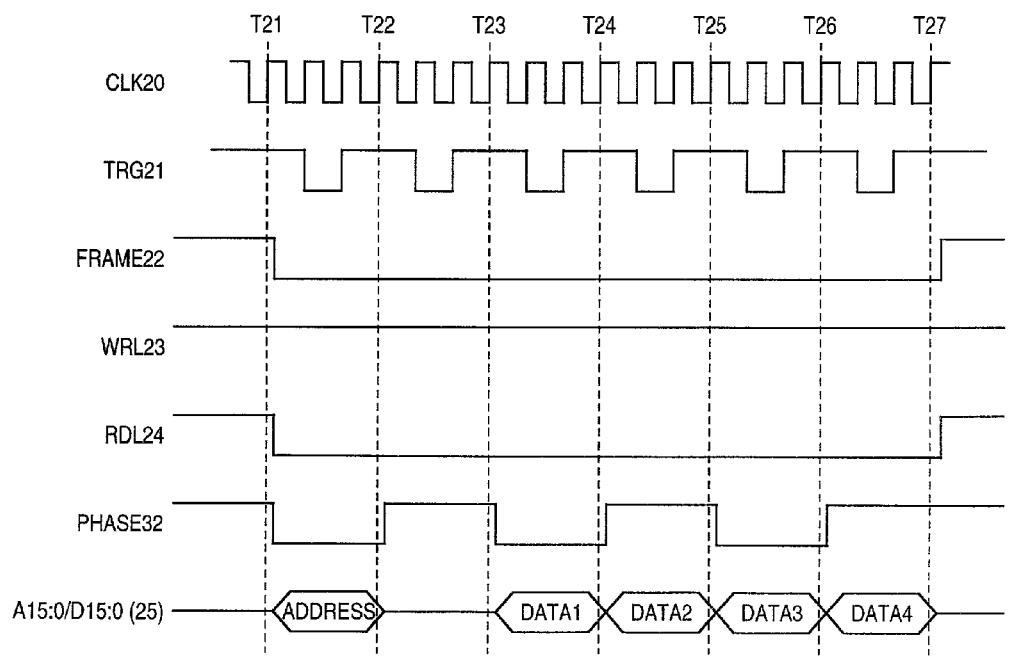
FIG. 10 is a timing chart showing time-series operations of respective signals in the reading process.

FIG. 10 is a timing chart showing time-series operations of respective signals in the reading process in the present embodiment.

Figure 11:
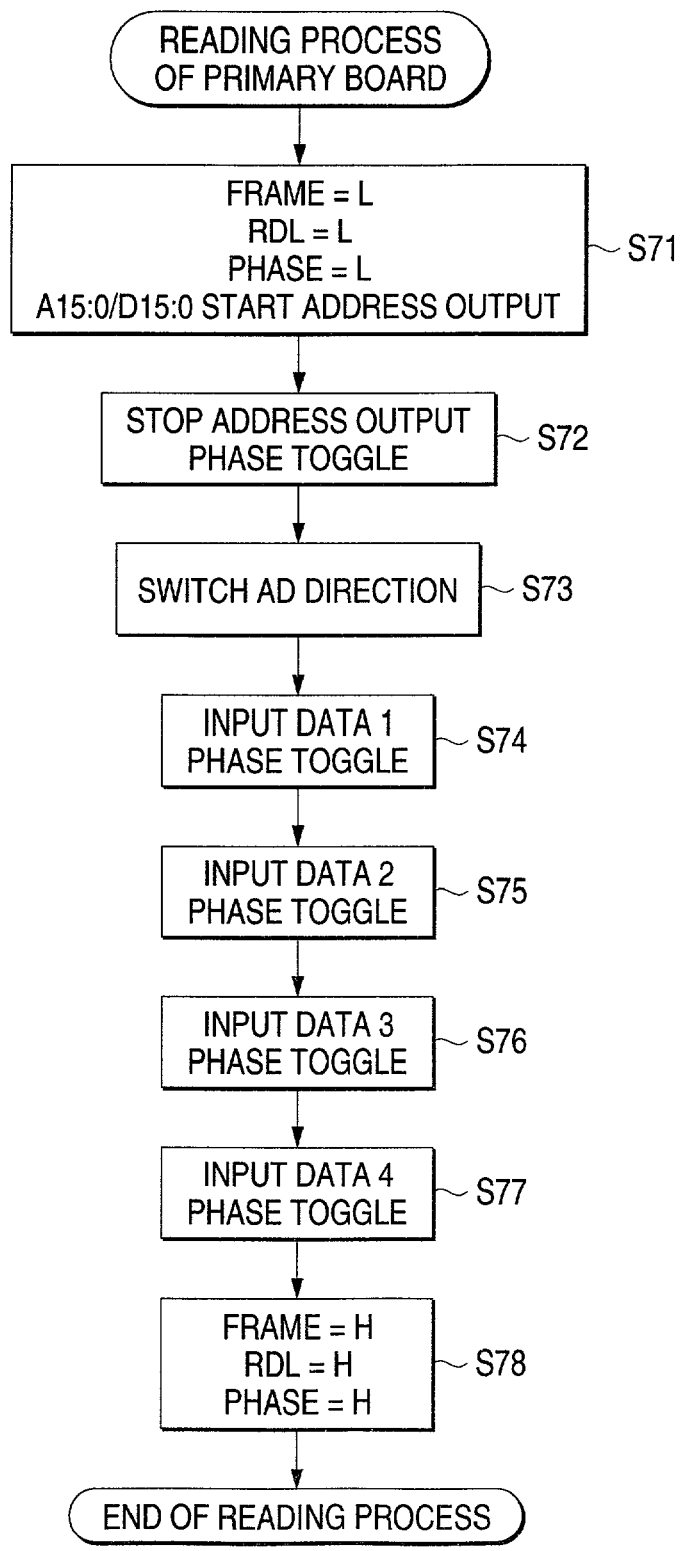
FIG. 11 is a flowchart showing a series of flows in the reading process of the primary board.

FIG. 11 is a flowchart showing flows in the reading process of the primary board in the present embodiment.

Figure 12:
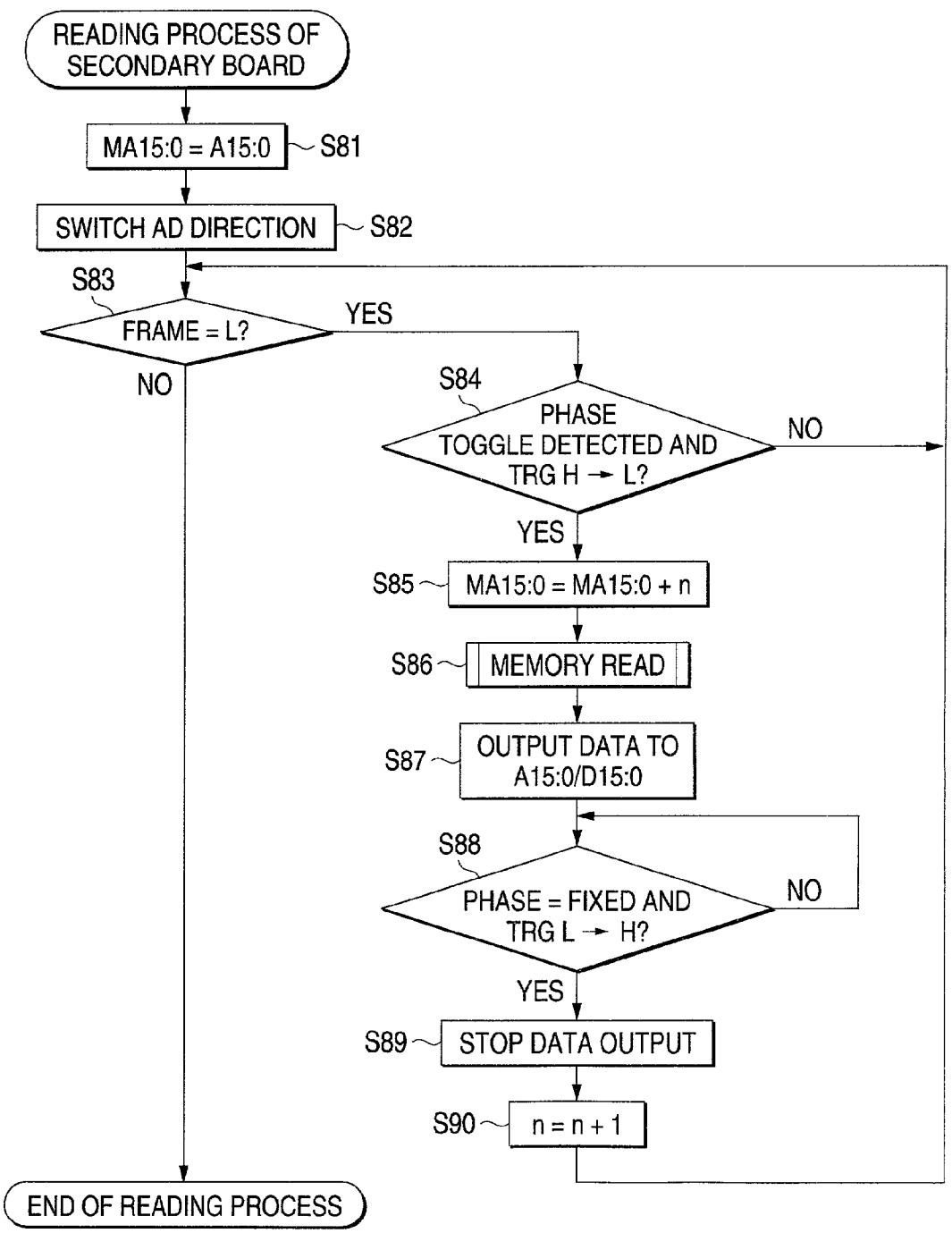
FIG. 12 is a flowchart showing flows in the reading process of the secondary board.

FIG. 12 is a flowchart showing a series of flows in the reading process of the separator of the secondary board in the present embodiment.

<T21 Period>

In the T21 period, in step S71, when the reading process is required, the primary board assigns the FRAME 22 indicating the transmission is being carried out to L, assigns the RDL 24 indicating the reading transmission to L, and assigns the transmission start address to the multiplex bus A15:0/D15:0 (25), in response to the leading edge of the CLK 20.

In addition, the primary board assigns the PHASE 32 indicating the first TRG 21 to L.

Meanwhile, in the T21 period, in step S81, when the secondary board detects the reading process about own station based on the satisfaction of A15:0=own address, such secondary board transfers contents of the multiplex bus A15:0/D15:0 (25) to MA15:0 (28) at the point of time of the trailing edge of the TRG 21 to define the address of the memory.

Then, the primary board causes the TRG 21 to fall down.

<T22 Period>

In the T22 period, the primary board executes step S72 to stop the address output. Also, in order to indicate the generation of the second TRG 21, the primary board toggles the PHASE 32 from L to H to switch the transmission direction from the output to the input, and then raises the TRG 21.

The secondary board executes step S82 to switch the transmission direction of the A15:0/D15:0.

<T23 Period>

In the T23 period, the primary board toggles the PHASE 32 to raise the TRG 21.

Meanwhile, the secondary board executes step S83 to check that the transmission is being carried out, and then checks that the PHASE 32 has been toggled and detects the trailing edge of the TRG 21 in step S84.

According to the present process, the secondary board does not shift to the next process until the PHASE 32 has been toggled and the TRG 21 has been caused to fall down.

The secondary board that has detected the trailing edge of the TRG 21 outputs the start address designated by the primary board to the memory in step S85, then executes the memory read by operating the MRDL 31 in step S86, and then outputs the data 1 to the A15:0/D15:0 (25) in step S87.

The primary board raises the TRG 21 and simultaneously receives the data 1 from the A15:0/D15:0 (25) in step S74 to execute the reading process.

Based on the fact that the PHASE 32 is not changed from its own falling and the TRG 21 is caused to rise, the secondary board executes step S89 to stop the data output to the A15:0/D15:0 (25), and then calculates the incremented value in order to prepare the next transmission address in step S90.

Here, if the noise is superposed on the TRG 21 to raise the TRG 21, the PHASE 32 has not been toggled and therefore it is impossible for the secondary board to pass through step S84, and thus the secondary board never erroneously outputs the next data. Conversely, even if the noise is superposed on the PHASE 32 but the TRG 21 is not raised, the secondary board does not process step S84 and therefore it is impossible similarly for the secondary board to pass through step S84 and also the secondary board never executes the next operation due to the noise.

<T24 Period>

In the T24 period, the primary board toggles the PHASE 32 and causes the TRG 21 to fall down.

The secondary board executes step S83 to check that the transmission is being carried out, and also checks that the PHASE 32 has been toggled and detects the trailing edge of the TRG 21 in step S84.

The secondary board that has detected the TRG 21 outputs the addition result of the start address designated by the primary board and the incremented value prepared in step S90 as the next transmission address to the memory in step S85, then executes the memory read in step S86, and then outputs the data 2 to the A15:0/D15:0 (25) in step S87.

The primary board raises the TRG 21 and simultaneously executes step S13 to receive the data 2 from the A15:0/D15:0 (25) and execute the reading process.

Based on the fact that the PHASE 32 is not changed from its own falling and the TRG 21 is caused to rise, the secondary board executes step S89 to stop the output to the A15:0/D15:0 (25), and then executes the preparation of the next transmission address in step S90.

<T25 Period>

In the T25 period, the primary board toggles the PHASE 32 and causes the TRG 21 to fall down. The secondary board executes step S83 to check that the transmission is being carried out, and then checks that the PHASE 32 has been toggled and detects the trailing edge of the TRG 21 in step S84.

The secondary board that has detected the TRG 21 outputs the addition result of the start address designated by the primary board and the incremented value prepared in step S90 to the memory as the next transmission address in step S85, then executes the memory read in step S36, and then outputs the data 3 to the A15:0/D15:0 (25) in step S87.

The primary board raises the TRG 21, and executes simultaneously step S76 to receive the data 3 from the A15:0/D15:0 (25) and execute the reading process.

Based on the fact that the PHASE 32 is not changed from its own falling and the TRG 21 is caused to rise, the secondary board executes step S89 to stop the output to the A15:0/D15:0 (25), and then executes the preparation of the next transmission address in step S90.

<T26 Period>

In the T26 period, the primary board toggles the PHASE 32 and causes the TRG 21 to fall down. The secondary board executes step S83 to check that the transmission is being carried out, and also checks that the PHASE 32 has been toggled and detects the trailing edge of the TRG 21 in step S84.

The secondary board that has detected the TRG 21 outputs the addition result of the start address designated by the primary board and the incremented value prepared in step S90 to the memory as the next transmission address in step S84, then executes the memory read in step S86, and then outputs the data 4 to the A15:0/D15:0 (25) in step S87.

The primary board raises the TRG 21, and executes step S77 at the same time to receive the data 4 from the A15:0/D15:0 (25) and execute the reading process.

Based on the fact that the PHASE 32 is not changed from its own falling and the TRG 21 is caused to rise, the secondary board executes step S89 to stop the output to the A15:0/D15:0 (25), and executes the preparation of the next transmission address in step S90.

<T27 Period>

The primary board executes step S78 in order to indicate the end of transmission, and assigns the FRAME 22, the RDL 24 and the PHASE 32 to H.

The secondary board detects the FRAME 22=H in step S83, and completes the reading process.

-Writing Process-

Next, the writing process will be explained with FIG. 13, FIG. 14, and FIG. 15 hereunder.

Figure 13:
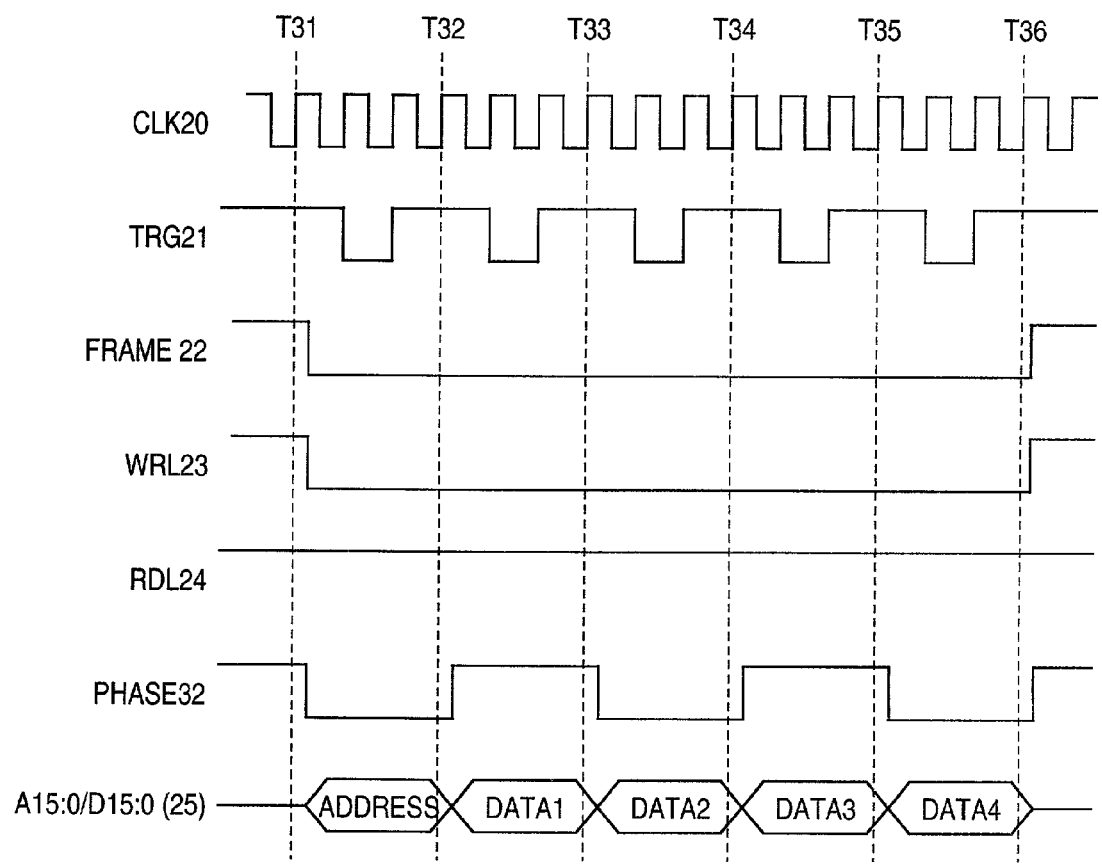
FIG. 13 is a timing chart showing time-series operations of respective signals in the writing process.

FIG. 13 is a timing chart showing time-series operations of respective signals in the writing process.

Figure 14:
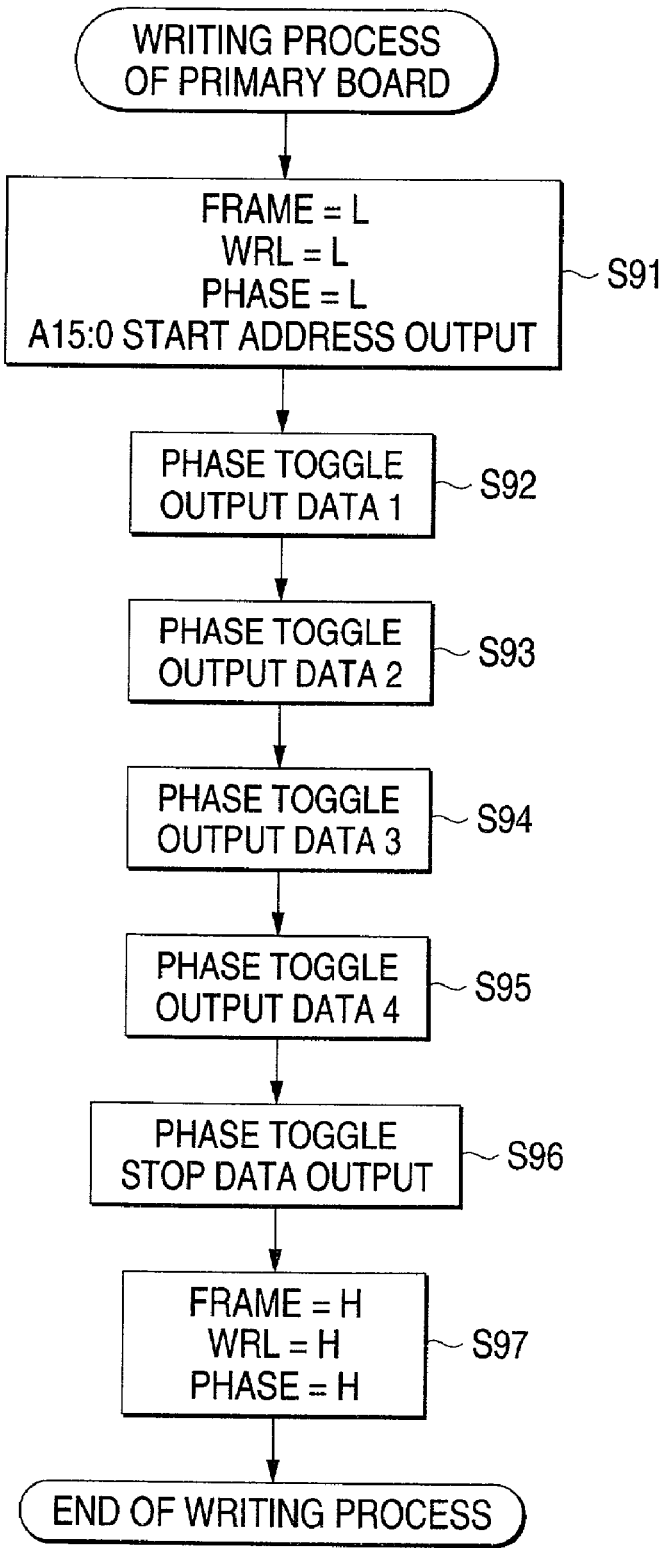
FIG. 14 is a flowchart showing a series of flows in the writing process of the primary board.

FIG. 14 is a flowchart showing a series of flows in the writing process of the primary board.

Figure 15:
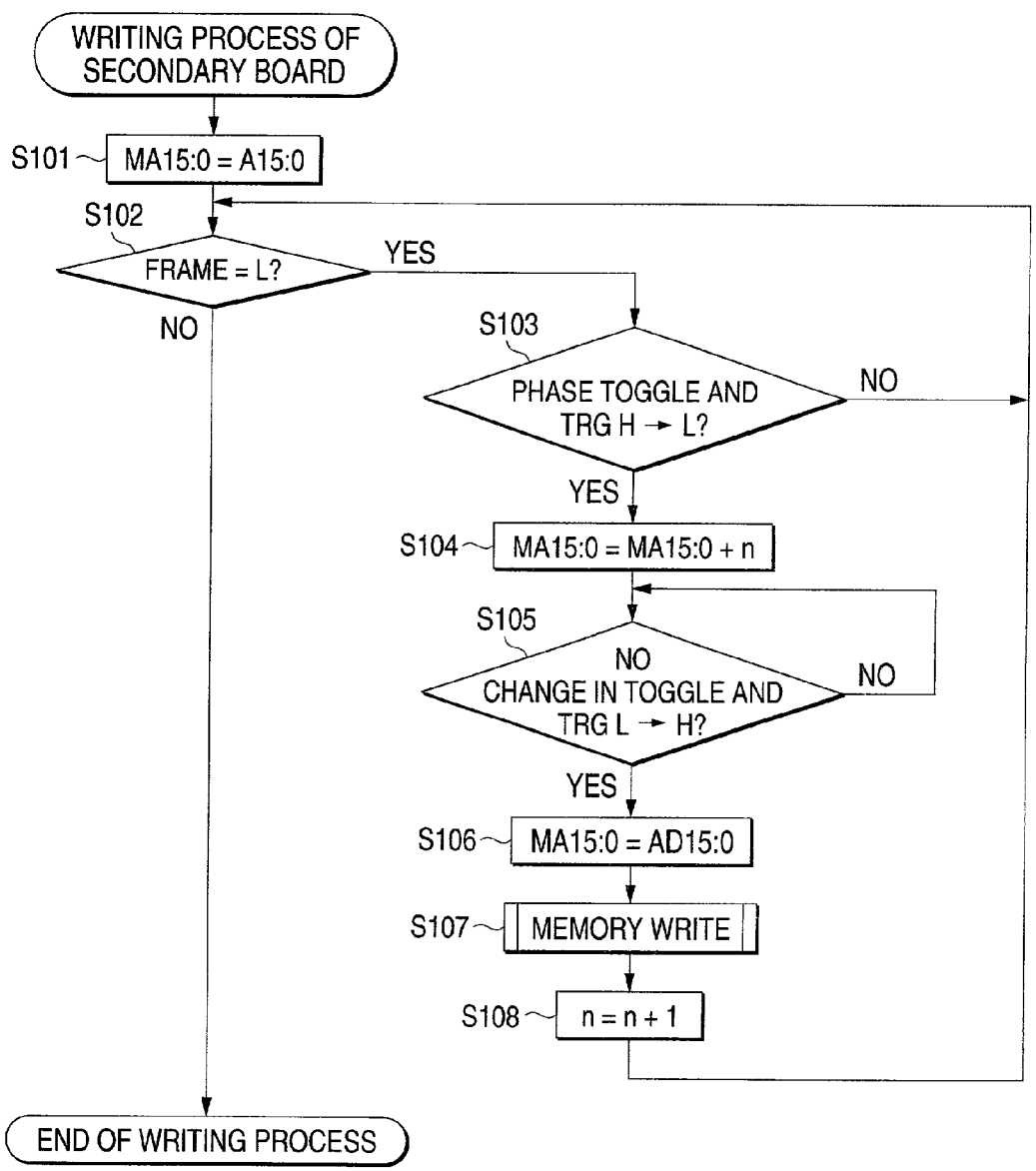
FIG. 15 is a flowchart showing flows in the writing process of the secondary board.
Figure 16:
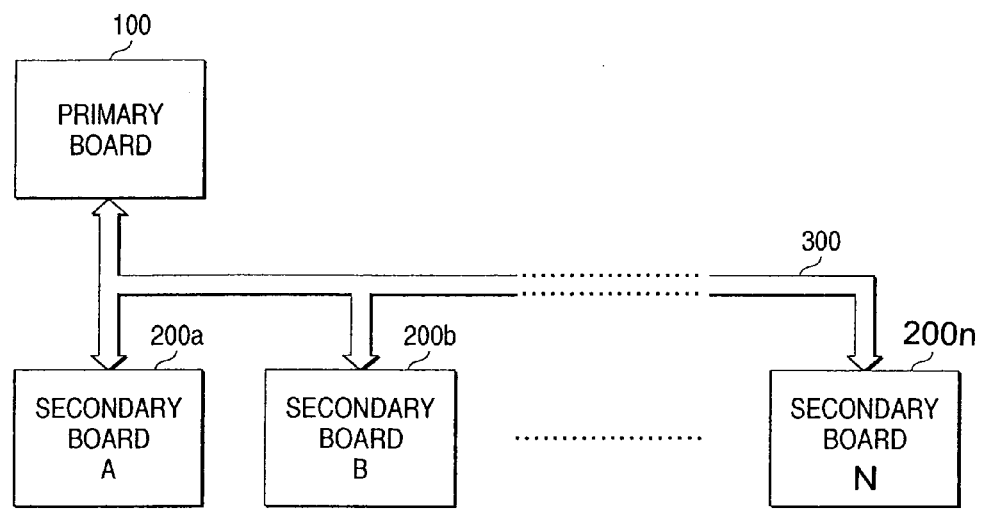
FIG. 16 is a system configurative view showing a system configuration in connection with the data transmission in the prior art.
Figure 17:
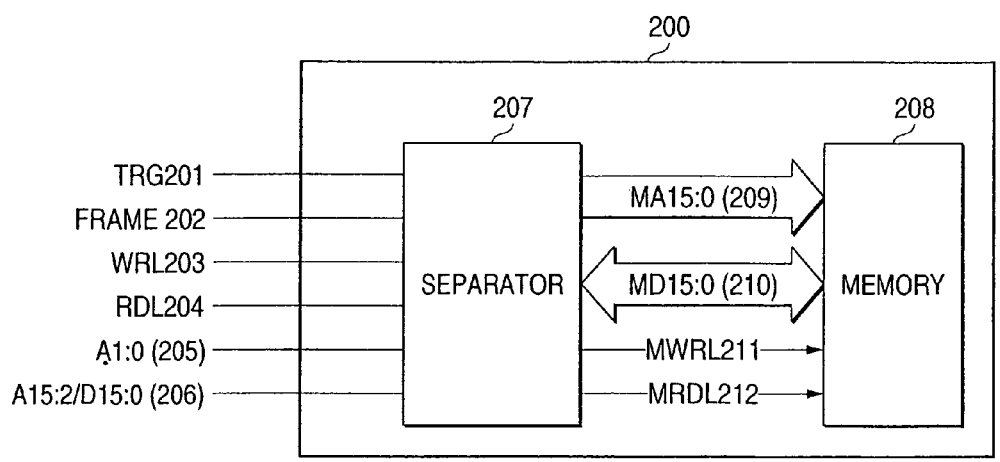
FIG. 17 is a view showing an internal configuration of the secondary board in the prior art.
Figure 18:
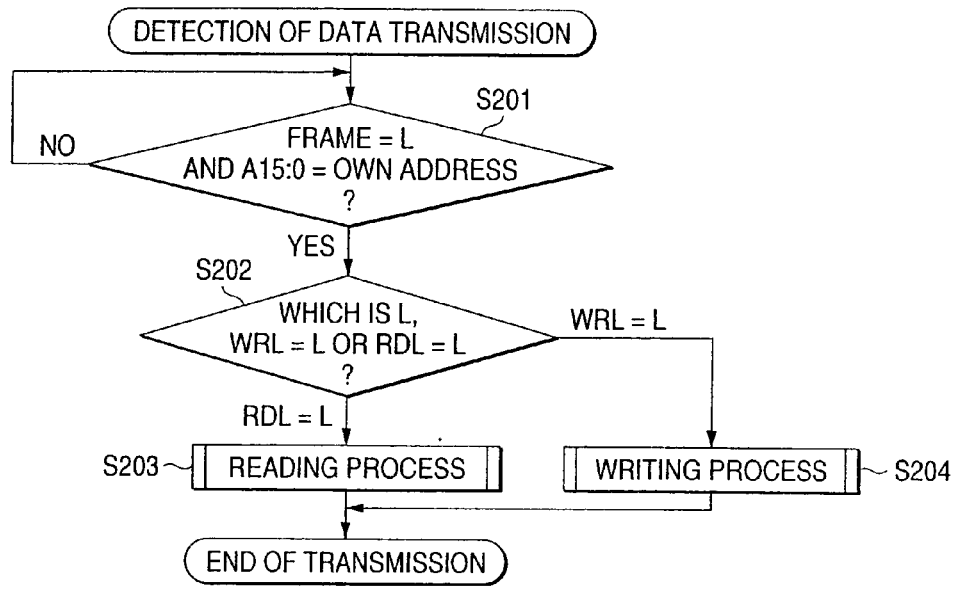
FIG. 18 is a flowchart showing an internal process in a separator.
Figure 19:
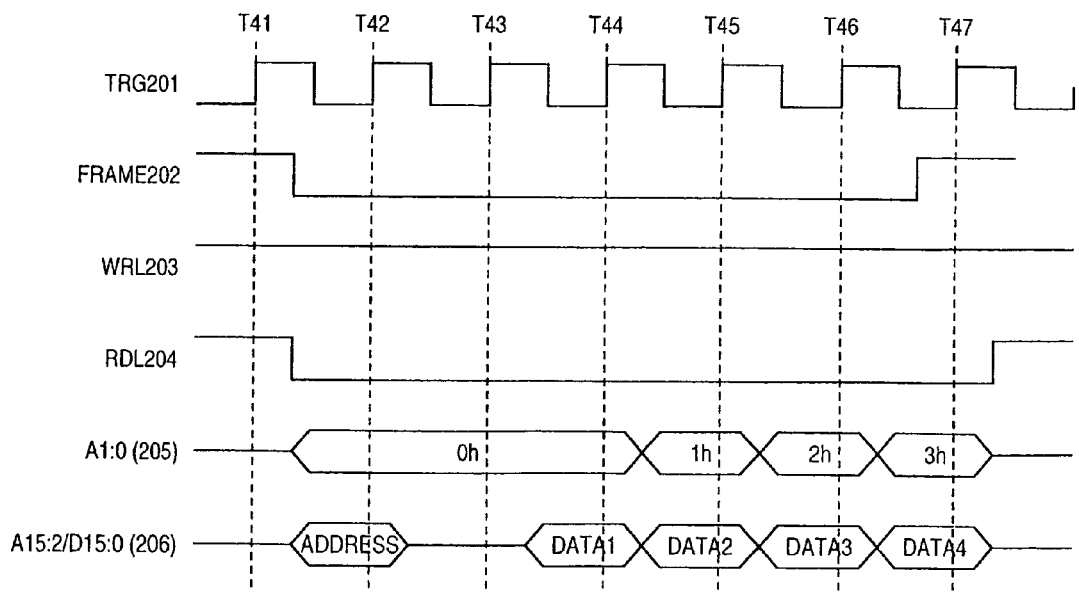
FIG. 19 is a timing chart showing time-series operations of respective signals in the reading process in the prior art.
Figure 20:
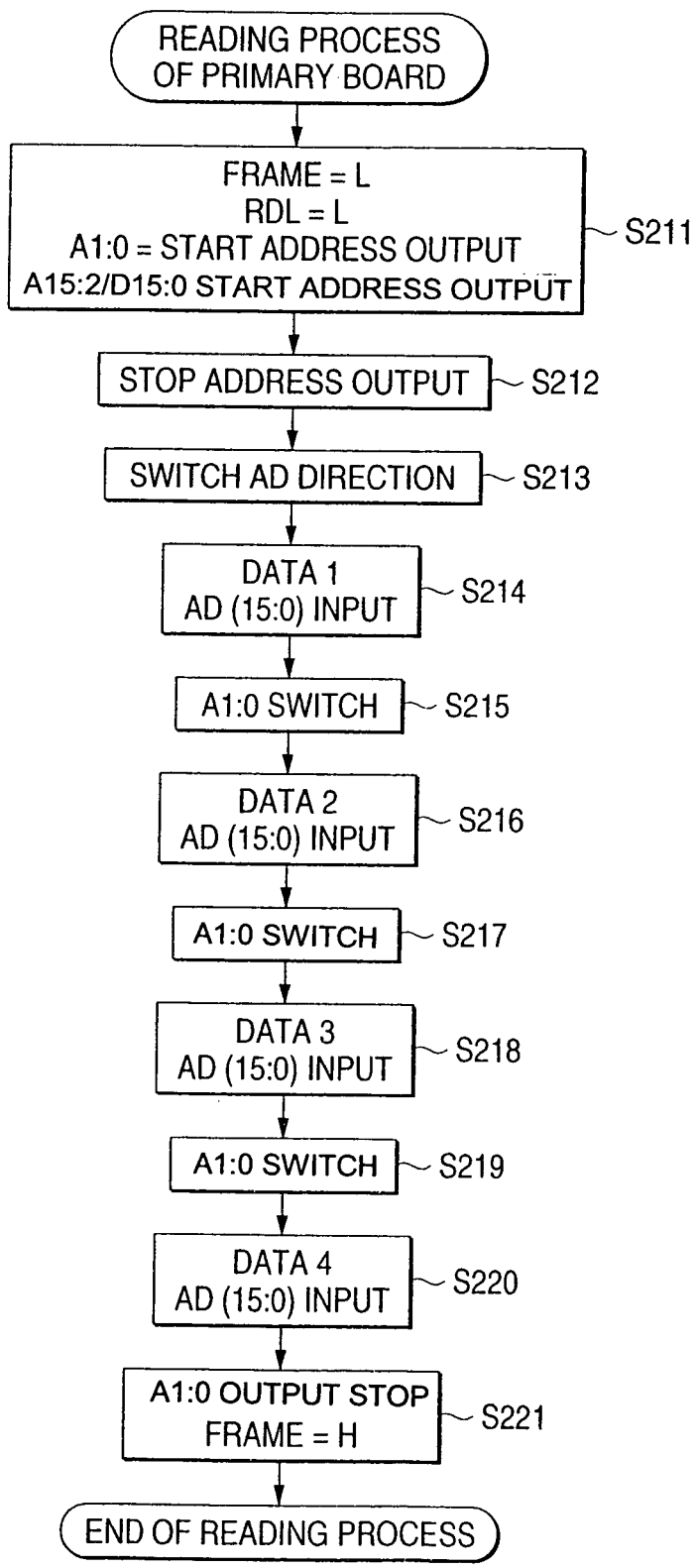
FIG. 20 is a flowchart showing a series of flows in the reading process of the primary board in the prior art.
Figure 21:
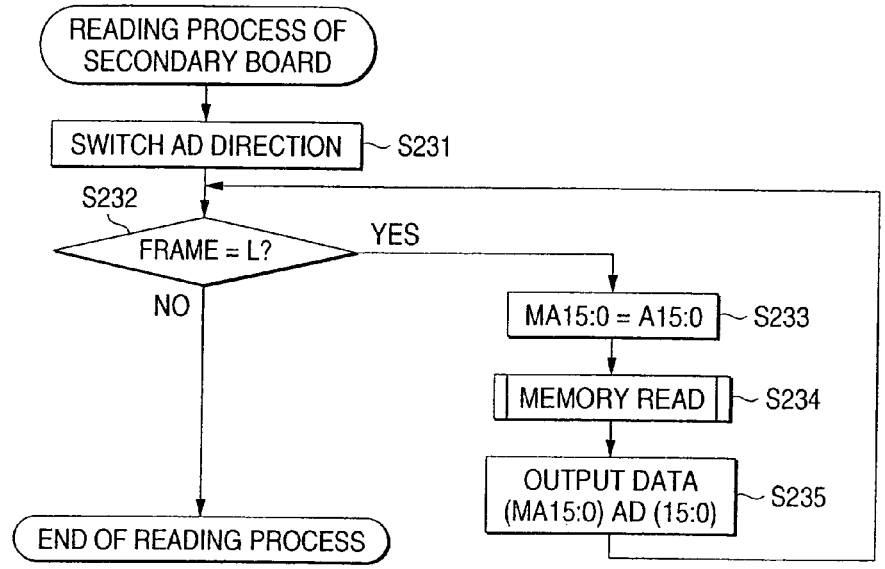
FIG. 21 is a flowchart showing a series of flows in the reading process of the secondary board in the prior art.
Figure 22:
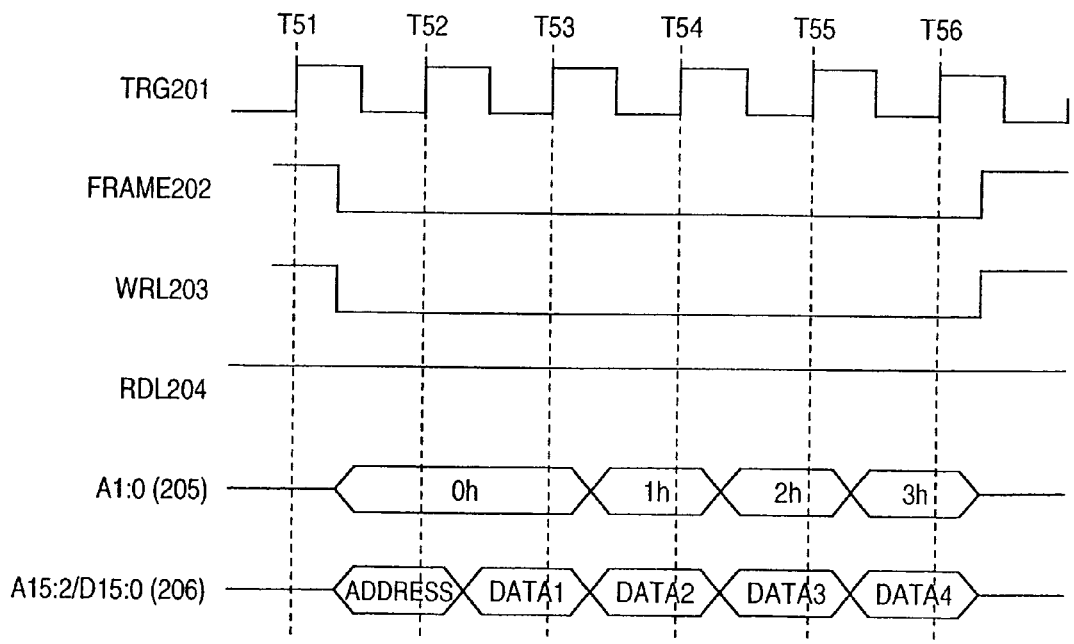
FIG. 22 is a timing chart showing time-series operations of respective signals in the writing process in the prior art.
Figure 23:
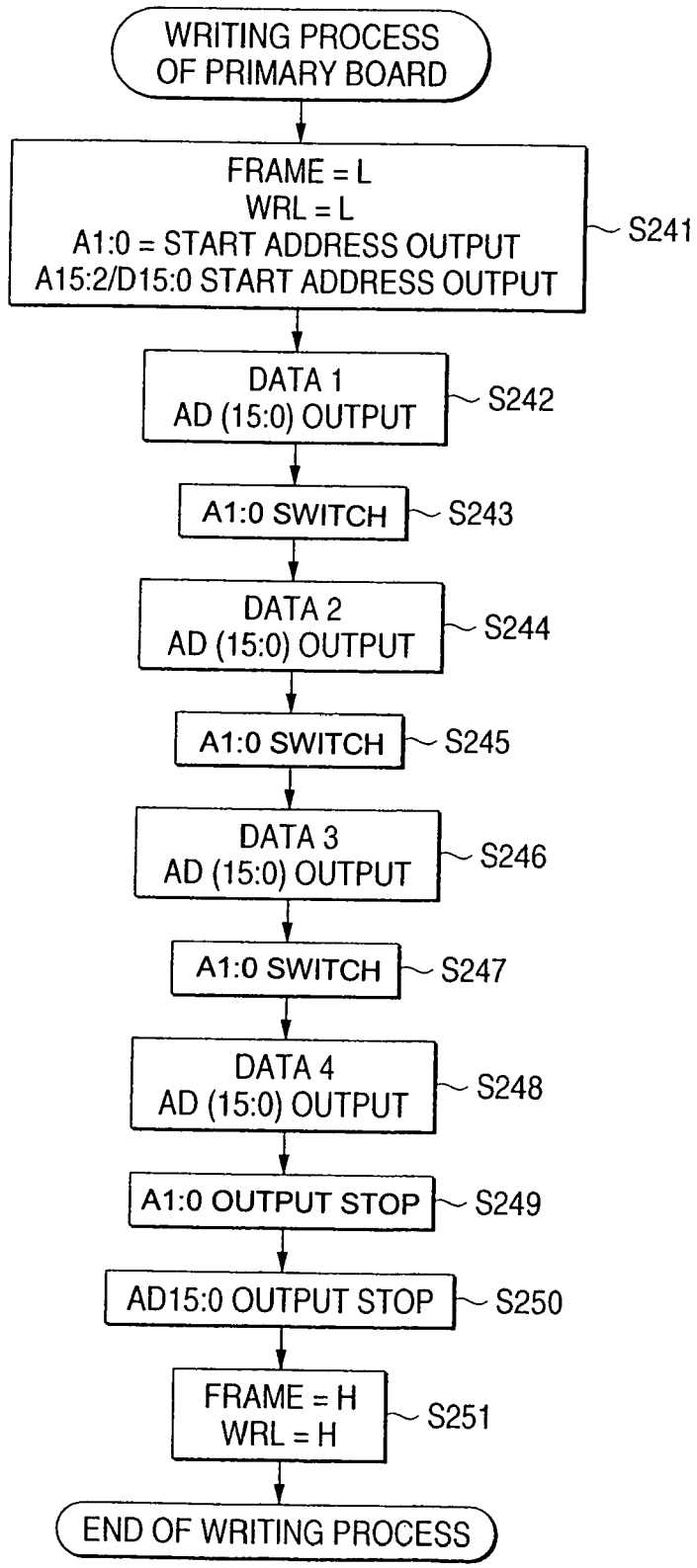
FIG. 23 is a flowchart showing a series of flows in the writing process of the primary board in the prior art.
Figure 24:
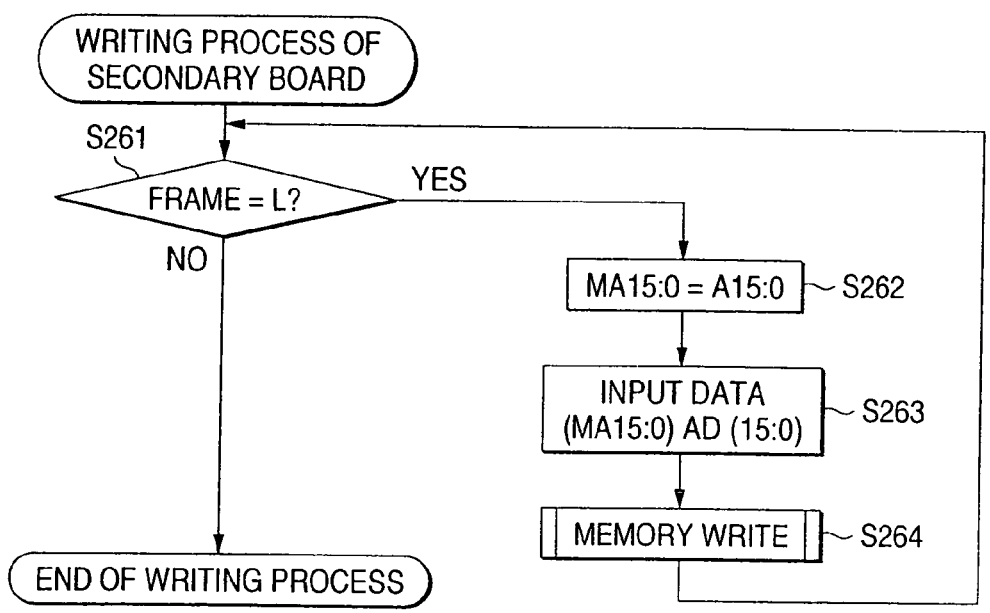
FIG. 24 is a flowchart showing a series of flows in the writing process of the secondary board in the prior art.

FIG. 15 is a flowchart showing flows in the writing process of the secondary board.

<T31 Period>

In the T31 period, when the writing process is required, the primary board assigns the FRAME 22 indicating that the transmission is being carried out to L, assigns the WRL 23 indicating the writing transmission to L, and assigns the start address to the multiplex bus A15:0/D15:0 (25), and assigns the PHASE 32 indicating the first TRG 21 to L, in response to the leading edge of the CLK 20 in step S91.

Then, the primary board that has outputted the above signals causes the TRG 21 to fall down.

In contrast, in the T31 period, the secondary board detects the writing transmission to own station based on the satisfaction of A15:0=own address, then transfers and holds contents of the multiplex bus A15:0/D15:0 (25), to which the transmission start address is assigned, to MA15:0 in step S101 and also defines the address of the memory.

Then, the primary board raises the TRG 21.

<T32 Period>

In the T32 period, the primary board executes step S92 to toggle the PHASE 32 and output the write data 1 to the multiplex bus A15:0/D15:0 (25).

Then, in order to inform the secondary board of the sending of the data, the primary board subsequently causes the TRG 21 to fall down.

The secondary board checks that the transmission is being carried out in step S102, then detects that the PHASE 32 has been toggled and the TRG 21 has been caused to fall down in step S103, and then outputs the address requested by the primary board to the memory via the MA15:0 (28) in step S104.

Then, the primary board raises the TRG 21, and requests the secondary board to write the data 1.

The secondary board detects that the PHASE 32 has not been changed from the rise of the TRG 21 and also the TRG 21 has been raised in step S105, then executes step S106 to output the write data 1 to the MD15:0, and then executes the memory write by operating the MWRL 30 in step S107. Then, the secondary board calculates the incremented value in step S108 to prepare for the next address, and then returns to step S102.

Here, if the noise is superposed on the TRG 21 to raise the TRG 21, it is impossible for the secondary board to pass through step S84 since the PHASE 32 has not been toggled, and thus the secondary board never erroneously writes the data into the next address. Conversely, even if the noise is superposed on the PHASE 32 but the TRG 21 is not raised, the secondary board does not process step S103, and therefore secondary board does not execute the operations in step S104 and after.

<T33 Period>

In the T33 period, the primary board executes step S93 to toggle the PHASE 32 and output the write data 2 to the A15:0/D15:0 (25).

Then, in order to inform the secondary board of the sending of the data, the primary board subsequently causes the TRG 21 to fall down.

At this point of time, the secondary board detects that the TRG 21 is raised in steps S102, then detects that the PHASE 32 has been toggled and the TRG 21 has been caused to fall down in step S103, and then outputs the addition value of the transmission start address of the primary board and the incremented value prepared in step S108 as the next transmission address to the memory via the MA15:0 (28) in step S104.

Then, the primary board raises the TRG 21, and requests the secondary board to write the data 2.

The secondary board detects that the PHASE 32 has not been changed from the fall of the TRG 21 and also the TRG 21 has been raised in step S105, then executes step S106 to output the write data 2 to the MD15:0, and then executes the memory write in step S107.

Then, the secondary board executes step S108 to prepare for the next address, and then returns to step S102.

<T34 Period>

In the T34 period, the primary board executes step S94 to toggle the PHASE 32 and output the write data 3 to the A15:0/D15:0 (25).

Then, in order to inform the secondary board of the sending of the data, the primary board causes subsequently the TRG 21 to fall down.

At this point of time, the secondary board checks that the transmission is being carried out in step S102, then detects that the PHASE 32 has been toggled and the TRG 21 has been caused to fall down in step S103, and then outputs the addition value of the transmission start address assigned by the primary board and the incremented value prepared in step S108 as the next transmission address to the memory via the MA15:0 (28) in step S104.

Then, the primary board raises the TRG 21 and requests the secondary board to write the data 3.

The secondary board detects that the PHASE 32 has not been changed from the fall of the TRG 21 and also the TRG 21 has been raised, then executes step S106 to output the write data 3 to the MD15:0, and then executes the memory write in step S107.

Then, the secondary board executes step S108 to prepare for the next address, and then returns to step S102.

<T35 Period>

In the T35 period, the primary board executes step S95 to toggle the PHASE 32 and output the write data 4 to the A15:0/D15:0 (25).

Then, in order to inform the secondary board of the sending of the data, the primary board causes subsequently the TRG 21 to fall down.

At this point of time, the secondary board checks that the transmission is being carried out in step S102, then detects that the PHASE 32 has been toggled and also the TRG 21 has been caused to fall down in step S103, and then outputs the addition value of the transmission start address assigned by the primary board and the incremented valued prepared in step S108 as the next transmission address to the memory via the MA15:0 (28) in step S104.

The primary board raises the TRG 21 and requests the secondary board to write the data 2.

The secondary board detects that the PHASE 32 has not been changed from the fall of the TRG 21 and also the TRG 21 has been raised in step S105, then executes step S106 to output the write data 2 to the MD15:0, and then executes the memory write in step S107.

Then, the secondary board executes step S108 to prepare for the next address, and then returns to step S102.

The primary board stops the PHASE 32 and the data output in step S96 after it raises the TRG 21, and then changes the FRAME 22, the WRL 23, and the PHASE 32 to H in step S97, whereby the write transmission process is ended.

The secondary board detects the completion of the write transmission in step S102, so that the writing process is completed.

In this embodiment 2, the leading edge and the trailing edge of the TRG 21 are detected in combination with the toggle states of the PHASE 32. Therefore, in addition to the advantages of the embodiment 1, malfunction in generating the MA15:0 in the separator 26A of the secondary board can be prevented even if disturbances such as the crosstalk, the reflection, etc. are generated on the TRG 21, and also a great deal of continuous data transmission can be accomplished via fewer signal lines safely against the disturbances.

INDUSTRIAL APPLICABILITY

As described above, the data transmission method according to the present invention is suitable for the data transmission that is capable of transmitting the data safely against various disturbances such as the skew, the reflection, etc., which act as causes of the malfunction when the continuous data transmission is carried out, via the fewer signal lines.

The invention claimed is:

1. A data transmission system, comprising:
    a primary board;
    secondary boards; and
    a data transmission path carrying out data transmission/reception between the primary board and the secondary boards, the data transmission path employs a same signal line as an address bus and a data bus mutually,
    wherein when the data access is executed from the primary board to the secondary boards, informing a start address required for data access, and wherein an address used in the data access in the secondary boards is generated based on the start address, a predetermined trigger signal and a cycle signal indicating switching of data, the cycle signal is combined with the trigger signal, and
    wherein the cycle signal counts plural times a leading edge of a clock signal of the primary board prior to toggle of the cycle signal.

2. The data transmission system according to claim 1, wherein, when the address is generated based on the trigger signal, the address is generated sequentially by incrementing the start address in response to a timing of the trigger signal.

3. The transmission system according to claim 1, wherein the cycle signal only indicates the switching of the data.

4. The transmission system according to claim 1, wherein the cycle signal is a separate toggle signal having only two states and wherein the trigger signal illustrates write and read timing of the data transmission path.

5. The transmission system according to claim 4, wherein the cycle signal is generated in the secondary board and wherein the cycle signal is a separate signal from the generated address and the received start address.

6. The transmission system according to claim 1, wherein the secondary board generates subsequent addresses used in data access based on the start address and wherein the subsequent addresses are generated by the secondary board by incrementing last address used.

7. The transmission system according to claim 1, wherein address signals are transmitted only in the same signal line.

8. A data transmission system comprising:
    a primary board;
    secondary boards; and
    a data transmission path for carrying out data transmission/reception between the primary board and the secondary boards, where the data transmission path employs a same signal line as an address bus and a data bus mutually,
    wherein:
        when the data access is executed from the primary board to the secondary boards, informing a memory start address of the secondary boards required for data access,
        judging in the secondary boards whether or not the memory start address is directed to own station, and then executing the data transmission via the data transmission path by accessing a memory in own station based on the memory start address when the memory start address is directed to own station, and an address is generated, to which the data transmission is subsequently executed, in the secondary boards by incrementing the memory start address after the data transmission based on the memory start address is ended, and then executing the data transmission via the data transmission path by accessing the memory of own station based on the generated address, wherein a cycle signal indicating switching of data is used in combination with a trigger signal, wherein, when disturbances are generated on the trigger signal during the data transmission/reception, the memory start address is not incremented, and wherein the secondary board does not shift to a next process until the cycle signal has been toggled, and leading and trailing edges of the trigger signal are detected in combination with detecting the toggle states of the cycle signal, wherein the cycle signal counts plural times a leading edge of a clock signal of the primary board prior to toggle of the cycle signal.

9. A method of transmitting data by a data transmission system comprising a primary board, secondary boards, and a data transmission path for carrying out data read between the primary board and the secondary boards, wherein the data transmission path employs a same signal line as an address bus and a data bus mutually, the method comprising:

informing a trigger signal combined with a cycle signal indicating a timing of data access, and a start address required for data read via the data transmission path;

switching the data transmission path to which the start address is informed as a data bus;

accessing a memory based on the start address and sending out a read result onto the data transmission path; and incrementing the start address at a timing of the trigger signal, and then sending out a read result onto the data transmission path by accessing the memory based on the incremented address, wherein the start address is not incremented when disturbances are generated on the trigger signal during the data read, and wherein the secondary board does not shift to a next process until the cycle signal has been toggled, and leading and trailing edges of the trigger signal are detected in combination with detecting the toggle states of the cycle signal, wherein the cycle signal counts plural times a leading edge of a clock signal of the primary board prior to toggle of the cycle signal.

10. A data transmission system comprising:
a primary board;
secondary boards; and
a data transmission path for carrying out data write between the primary board and the secondary boards, where the data transmission path employs a same signal line as an address bus and a data bus mutually, wherein the carrying out of the data write is executed by:
informing a trigger signal combined with a cycle signal indicating a timing of data access and a start address required for data write via the data transmission path, switching the data transmission path to which the start address is informed as a data bus, and then sending out a predetermined data to be written to a memory;

accessing the memory based on the start address, and then writing the predetermined data into the memory, incrementing the start address at a timing of the trigger signal, and then writing sequentially the predetermined data, that are sent out via the data transmission path, into the memory by accessing the memory based on the incremented address, detecting leading and trailing edges of the trigger signal in combination with detecting toggle states of the cycle signal, not incrementing the start address when disturbances are generated on the trigger signal during the data write, and not shifting the secondary board to a next process until the cycle signal has been toggled, wherein the cycle signal counts plural times a leading edge of a clock signal of the primary board prior to toggle of the cycle signal.

11. A method for carrying out data write between a primary board and secondary boards by using a data transmission path, which employs a same signal line as an address bus and a data bus mutually, comprising:

informing a trigger signal combined with a cycle signal indicating a timing of data access and a start address required for data write via the data transmission path;

switching the data transmission path to which the start address is informed as a data bus, and then sending out a predetermined data to be written to a memory;

accessing the memory based on the start address, and then writing the predetermined data into the memory; and incrementing the start address at a timing of the trigger signal, and then writing sequentially the predetermined data, that are sent out via the data transmission path, into the memory by accessing the memory based on the incremented address, wherein the cycle signal counts plural times a leading edge of a clock signal of the primary board prior to toggle of the cycle signal.

* * * * *